(12) United States Patent
Kawano

(10) Patent No.: US 7,167,581 B2
(45) Date of Patent: Jan. 23, 2007

(54) MEDICAL IMAGE PROCESSING METHOD AND APPARATUS FOR DISCRIMINATING BODY PARTS

(75) Inventor: Tsutomu Kawano, Tokyo (JP)

(73) Assignee: Konica Corporation, Tokyo (JP)

( * ) Notice: Subject to any disclaimer, the term of this patent is extended or adjusted under 35 U.S.C. 154(b) by 172 days.

(21) Appl. No.: 10/920,066

(22) Filed: Aug. 17, 2004

(65) Prior Publication Data

US 2005/0018895 A1    Jan. 27, 2005

Related U.S. Application Data

(62) Division of application No. 09/819,400, filed on Mar. 28, 2001, now abandoned.

(30) Foreign Application Priority Data

Apr. 4, 2000  (JP) .............................. 2000-102319

(51) Int. Cl.
*G06K 9/00* (2006.01)
*G06K 9/66* (2006.01)
*G06K 9/68* (2006.01)

(52) U.S. Cl. ...................... 382/128; 382/190; 382/218

(58) Field of Classification Search ................ None
See application file for complete search history.

(56) References Cited

U.S. PATENT DOCUMENTS 5,270,530 A    12/1993  Godlewski et al.
5,345,513 A    9/1994   Takeda et al.
5,644,647 A *  7/1997   Cosgrove et al. ........... 382/162
5,893,095 A *  4/1999   Jain et al. ...................... 707/6
5,943,435 A    8/1999   Gaborski

FOREIGN PATENT DOCUMENTS

| JP | 55-012429 | 1/1980 |
|----|-----------|--------|
| JP | 63-189853 | 8/1988 |
| JP | 06-342098 | 12/1994 |
| JP | 09-090048 | 4/1997 |

* cited by examiner

*Primary Examiner*—Jingge Wu
*Assistant Examiner*—Charles Kim
(74) *Attorney, Agent, or Firm*—Frishauf, Holtz, Goodman & Chick, PC

(57) ABSTRACT

An image processor wherein a radiation image forming device forms a radiation image corresponding to the radiation amount transmitted through an object, a discriminator discriminates at least one of the region of the object and the radiographing orientation for a radiation image, and an image processing condition memorizing device memorizes each of a plurality of image processing conditions in accordance with each of the regions of an object, each of the directions of radiographing, or each of the combinations of both of these. At least one image processing condition is displayed, and an image processing condition selects an arbitrary image processing condition out of the displayed image processing conditions. At least one image processing condition is read out from the image processing condition memorizing device based on the result of discrimination obtained by the discriminator and is displayed, and the selecting of an arbitrary image processing condition out of the displayed image processing conditions is accepted.

27 Claims, 15 Drawing Sheets

FIG. 8(a)
FIG. 8(b)
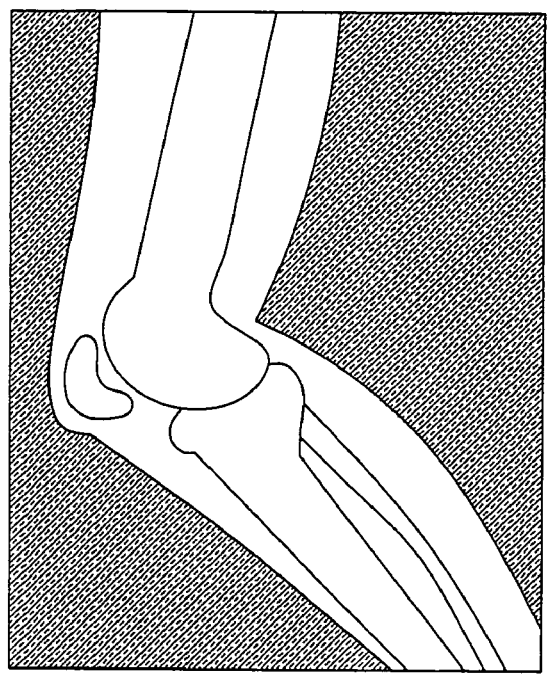
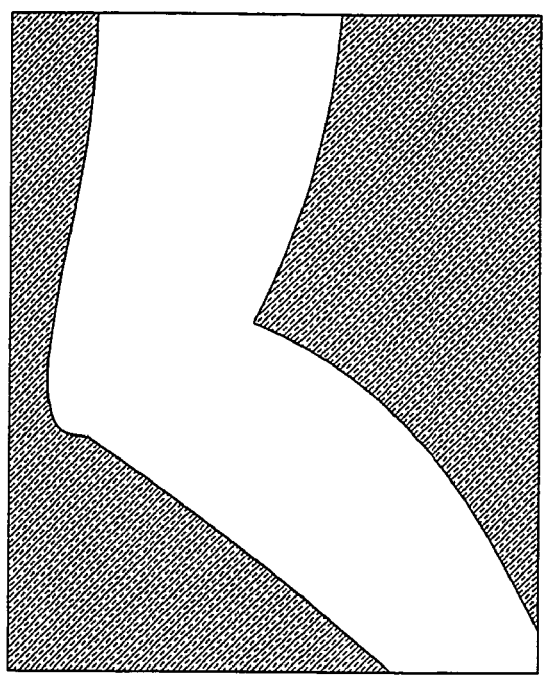

FIG. 10 (a)
| -2 | 0 | 4 | 0 | -2 | j = 0 |
i = -2  i = -1  i = 0  i = 1  i = 2
n = 1
FIG. 10 (b)
| -2 | j = -2 |
| 0 | j = -1 |
| 4 | j = 0 |
| 0 | j = 1 |
| -2 | j = 2 |
i = 0
n = 2
FIG. 10 (c)
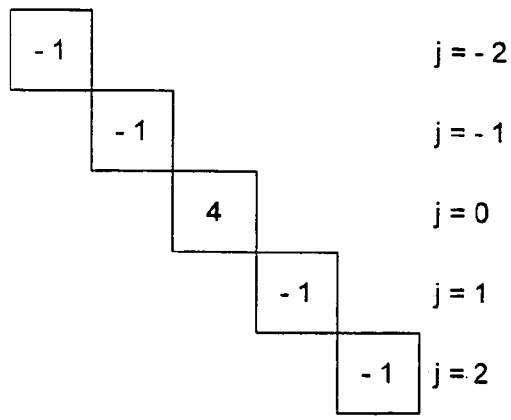
i = -2  i = -1  i = 0  i = 1  i = 2
n = 3
FIG. 10 (d)
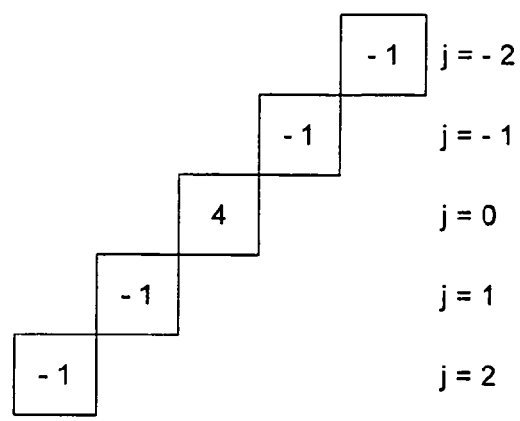
i = -2  i = -1  i = 0  i = 1  i = 2
n = 4

——— : CONTINUOUS EDGE

FIG. 14

ROUTINE

ID K001
NAME
SEX
DATE OF BIRTH
COMMENT
TIME OF RADIOGRAPHING

THORACIC NO ROTATION
K001 VERTEBRAE INVERSION 0°
AP

OK

NEXT SUITABLE :

RE-RADIOGRAPHING

RIBS

THORAX LAT

THORAX PA

DETAIL

REGISTRATION LIST

INSPECTION FINISHED

CLEAR

PATIENT INFORMATION

CONDITION DESIGNATION

INPUT

OUTPUT

PROCESSING

ORDER

PREVIOUS PAGE

NEXT PAGE

START READING

MEDICAL IMAGE PROCESSING METHOD AND APPARATUS FOR DISCRIMINATING BODY PARTS

CROSS-REFERENCE TO RELATED APPLICATIONS

This is a divisional of U.S. patent application Ser. No. 09/819,400, filed Mar. 28, 2001, now abandoned the entire disclosure of which is incorporated herein by reference.

This application is based upon and claims the benefit of priority from the prior Japanese Patent Application No. 2000-102319, filed Apr. 4, 2000, the entire contents of which is incorporated herein by reference.

BACKGROUND OF THE INVENTION

This invention relates to an image processing selecting method, an image selecting method, and an image processing apparatus for processing a radiation image, and in particular, to an image processing selecting method, an image selecting method, and an image processing apparatus which are capable of selecting an optimum processing condition for a radiation image.

In recent years, an apparatus capable of radiographing a radiation image directly as a digital image has been developed. For example, for an apparatus which detects the amount of radiation applied to a radiography object (subject) and obtains a radiation image formed corresponding to the detected amount as an electrical signal, a number of methods in which a detector using a stimulable phosphor is employed have been disclosed in the publications of unexamined patent application S55-12429, S63-189853, etc.

In such an apparatus, radiation which has once transmitted through a radiography object is applied to a detector having a stimulable phosphor layer bonded on its sheet-shaped substrate by coating or vapor deposition, and is absorbed by the stimulable phosphor layer. After that, by stimulating this stimulable phosphor layer by light or heat energy, the radiation energy accumulated in this stimulable phosphor layer through the above-mentioned absorption is emitted as a fluorescent light, and this fluorescent light is photoelectrically converted, to obtain an image signal.

On the other hand, it has been proposed an apparatus for detecting radiation image which is obtained by generating charge corresponding to the intensity of the applied radiation in a photoconductive layer, accumulating the generated charge in a plurality of capacitors arrayed two-dimensionally, and taking out the accumulated amounts of charge.

In such a radiation image detector, what is called a flat-panel detector (an FPD) is used. For an FPD of this kind, as described in the publication of unexamined patent application H9-90048, it has been known what is actualized by the combination of a phosphor emitting fluorescent light in accordance with the intensity of the radiation applied and a photoelectric conversion device such as a photodiode array or a CCD sensor which performs photoelectric conversion by receiving the fluorescent light emitted by the phosphor directly or through a reduction optical system. Further, a similar FPD is noted in the publication of unexamined patent application H6-342098.

In such an apparatus, in order to express a radiation image in a gradation suitable for diagnosis, it is desirable to make a gradation conversion automatically for the image obtained by such an apparatus as mentioned in the above in a manner such that a medical doctor can easily observe the portion to be watched (interest region).

In order to carry out such an automatic gradation conversion, it is done to determine the processing condition from the statistical feature of the image data (the maximum value, minimum value, histogram, etc. of the data) to apply image processing to the whole image.

Further, in order to make the structure of minute portions easy to observe, edge enhancement processing is carried out, and dynamic range compression processing for narrowing the signal range of the radiography object to make both of the portion of high density and the portion of low density simultaneously easy to observe, etc. are also done.

However, in a radiography to be utilized in diagnosis, the body part becoming the radiography target is diversified from the head to limbs, and because the region to be watched by a medical doctor is different for each case, the image processing condition for obtaining an image which is most suitable for diagnosis becomes different for each radiography body part. Further, in the same way, the processing condition becomes different also in accordance with the radiographing orientation (the radiographing direction) in which the radiography object is placed.

For that reason, heretofore, in these apparatus, it is necessary to input the radiographed body part of the radiography object, the radiographing orientation, etc. before carrying out image processing in order to select the most suitable condition.

In some hospitals, there are provided a hospital information system (HIS) or a radiology information system (RIS), and the information on the radiographed body part can be obtained directly from the order information for the radiographing; therefore, without a special operation of a radiologist, the selection of the optimum processing condition is possible; however, because in many hospitals, there is provided no such system, it is necessary for a radiologist or some one like that to input these bits of information manually.

Further, in a radiographing in an emergency, in order to carry out it rapidly, in some cases a radiologist or the other person manually inputs the information on the body part of an radiography object etc. even in the hospitals provided with the above-mentioned HIS or RIS.

However, there are more than one hundred kinds of body parts to be generally radiographed, and it is troublesome to make the above-mentioned manual input operation every time when radiographing is carried out, which has been a burden for radiologists who carry out radiographing.

Therefore, in order to lighten the burden for radiologists, it has been required to select the optimum processing condition easily for a radiographed image.

SUMMARY OF THE INVENTION

It is an object of this invention to actualize an image processing selecting method, an image selecting method, and an image processing apparatus capable of obtaining an optimum image for diagnosis without a troublesome operation, by selecting and presenting one or a plurality of proper image processing conditions regarded as suitable ones through recognizing the region of a radiography object and the radiographing orientation, and selecting an optimum condition out of those image processing conditions presented.

That is, this invention to solve the above-mentioned problem is as follows.

(1) An image processing apparatus comprising radiation image forming means for detecting the radiation amount transmitted through a radiography object and forming a radiation image corresponding to the detected amount, discriminating means for discriminating at least one of the body part of a radiography object and the radiographing orientation, for the radiation image formed by said radiation image forming means, image processing condition memorizing means for memorizing each of a plurality of image processing conditions in accordance with each of the body parts of a radiography object, each of the directions of radiographing, or each of the combinations of both of these, display means for displaying a single or a plurality of image processing conditions, and image processing condition selecting means capable of selecting an arbitrary image processing condition out of the image processing conditions displayed on said display means, wherein said image processing condition selecting means reads out and displays one or a plurality of image processing conditions from said image processing condition memorizing means on the basis of the result of discrimination obtained by said discriminating means, and accepts the selection of an arbitrary image processing condition out of said image processing conditions displayed.

Further, an image processing selecting method in an image processing apparatus comprising radiation image forming means for detecting the radiation amount transmitted through a radiography object and forming a radiation image corresponding to the detected amount, discriminating means for discriminating at least one of the body part of a radiography object and the radiographing orientation for the radiation image formed by said radiation image forming means, image processing condition memorizing means for memorizing each of a plurality of image processing conditions in accordance with each of the body parts of a radiography object, each of the directions of radiographing, or each of the combinations of both of these, display means for displaying a single or a plurality of image processing conditions, and image processing condition selecting means capable of selecting an arbitrary image processing condition out of the image processing conditions displayed on said display means, wherein one or a plurality of image processing conditions are read out from said image processing condition memorizing means on the basis of the result of discrimination obtained by said discriminating means, the read out image processing conditions are displayed by said display means, and the selection of an arbitrary image processing condition out of said image processing conditions displayed is accepted by said image processing condition selecting means.

According to these inventions, in processing a radiation image obtained by detecting the radiation amount transmitted through a radiography object, image processing is carried out in a manner such that the body part of the radiography object and the radiographing orientation are discriminated for the radiation image, one or a plurality of proper image processing conditions are automatically read out of plural image processing conditions which have been optimized beforehand for each of the body parts of a radiography object and memorized, and one that is judged as an optimum condition by an operator is selected on the basis of the read out image processing conditions.

Owing to this, for a radiation image, it becomes possible that one or a plurality of proper image processing conditions regarded as suitable ones are selected and presented by recognizing the radiographed body part of a radiography object and the radiographing orientation, and an optimum condition out of those presented image processing conditions is selected, which makes it possible to obtain an optimum image for diagnosis without a troublesome operation.

(2) An image processing apparatus as set forth in (1), wherein said image processing condition selecting means comprises one or a plurality of image display means, a processed image is produced by applying image processing to a radiation image by the aforesaid image processing means for each of one or a plurality of image processing conditions read out from the aforesaid image processing condition memorizing means on the basis of the result of discrimination by the aforesaid discriminating means, and said processed images are displayed on said image display means together with the image processing conditions applied to said processed images respectively.

Further, an image processing selecting method as set forth in (1) in an image processing apparatus which is further provided with image display means for displaying a radiation image having been subjected to image processing by image processing means, wherein a processed image is produced by applying image processing to a radiation image by the aforesaid image processing means for each of one or a plurality of image processing conditions read out from the aforesaid image processing condition memorizing means on the basis of the result of the discrimination by the aforesaid discriminating means, and said processed images are displayed on said image display means together with the image processing conditions applied to said processed images respectively.

According to these inventions, in the above-mentioned (1), it is produced a processed image which has been subjected to image processing for each of one or a plurality of image processing conditions read out on the basis of the result of the discrimination, and said processed images are displayed on said image display means together with the image processing conditions applied to said processed images respectively.

Owing to this, in addition to the above-mentioned (1), by making the image after image processing capable of being visually grasped, it is possible to select an optimum image processing condition and a processed image easily.

(3) An image processing apparatus as set forth in (1) or (2), wherein the aforesaid image processing condition selecting means displays the name of image processing for specifying an image processing condition.

Further, an image processing selecting method as set forth in (1) or (2), the name of image processing for specifying an image processing condition is displayed.

According to these inventions, in the above-mentioned (1) or (2), the name of image processing for specifying an image processing condition is displayed.

Owing to this, in addition to the above-mentioned (1) or (2), it becomes possible to grasp the kind of an image processing condition easily by the display of the name of image processing, and an optimum image processing condition can be easily selected.

(4) An image processing selecting method as set forth in (3), wherein the aforesaid name of image processing is expressed by any one of the following: a radiographed body part of a radiography object, a radiographed body part of a radiography object and the radiographing orientation, and the radiographing orientation.

Further, an image processing apparatus as set forth in (3), wherein the aforesaid name of image processing is expressed by any one of the following: a radiographed body part of a radiography object, a radiographed body part of a radiography object and the radiographing orientation, and the radiographing orientation.

Owing to this, in addition to the above-mentioned (3), by making the name of image processing a name representing a radiographed body part of a radiography object, a radiographed body part of a radiography object and the radiographing orientation, or the radiographing orientation, it becomes possible to grasp the kind of an image processing condition, and an optimum image processing condition can be more easily selected.

(5) An image processing selecting method as set forth in any one of (1) to (4), wherein, with respect to each of image processing conditions or the image processing condition selected, it is also displayed whether rotation of image is included in it or not or whether inversion of image is included or not.

Further, an image processing apparatus as set forth in any one of (1) to (4), wherein, with respect to each of image processing conditions or an image processing condition selected, it is also displayed whether rotation of image is included in it or not or whether inversion of image is included or not.

According to these inventions, in the above-mentioned (1) to (4), with respect to each of image processing conditions or an image processing condition selected, it can be easily known whether inversion or rotation of image is included; therefore, the possibility of an erroneous diagnosis or the like owing to a careless image processing can be reduced.

(6) An image processing apparatus comprising radiation image forming means for detecting the radiation amount transmitted through an radiography object and forming a radiation image corresponding to the detected amount, discriminating means for discriminating at least one of the region of a radiography object and the direction of photographing, for the radiation image formed by said radiation image forming means, image processing condition memorizing means for memorizing each of a plurality of image processing conditions in accordance with each of the regions of a radiography object, each of the directions of radiographing, or each of the combinations of both of these, image processing means for applying image processing based on an arbitrary image processing condition to said radiation image, and image selecting means displaying a single or a plurality of images and being capable of selecting an arbitrary image out of the displayed images, wherein one or a plurality of suitable image processing conditions are read out from said image processing condition memorizing means on the basis of the result of discrimination obtained by said discriminating means, a processed image is produced by applying image processing to said radiation image by said image processing means for each of one or a plurality of image processing conditions read out, one or a plurality of said processed images are displayed on said image display means simultaneously or one by one by switching, and an arbitrary image can be selected out of said displayed processed images.

Further, an image selecting method in an image processing apparatus comprising radiation image forming means for detecting the radiation amount transmitted through an photographic object and forming a radiation image corresponding to the detected amount, discriminating means for discriminating at least one of the region of a radiography object or the radiographing orientation for the radiation image formed by said radiation image forming means, image processing condition memorizing means for memorizing a plurality of image processing conditions in accordance with each of the regions of a radiography object, each of the directions of radiographing, or each of the combinations of both of these, image processing means for applying image processing based on an arbitrary image processing condition to said radiation image, and image selecting means displaying a single or a plurality of images and being capable of selecting an arbitrary image out of the displayed images, wherein one or a plurality of suitable image processing conditions are read out from said image processing condition memorizing means on the basis of the result of the discrimination obtained by said discriminating means, a processed image is produced by applying image processing to a radiation image by the aforesaid image processing means for each of one or a plurality of image processing conditions read out, one or a plurality of said processed images are displayed on said image display means simultaneously or one by one by switching, and an arbitrary image can be selected out of said displayed processed images.

According to these inventions, one or a plurality of suitable image processing conditions are read out on the basis of the result of the discrimination, it is produced a processed image subjected to image processing for each of the read out image processing conditions, one or a plurality of said processed images are displayed simultaneously or one by one by switching, and an arbitrary image can be selected out of said displayed processed images.

Owing to this, it is possible to select a processed image which has been obtained by applying image processing to a radiation image in an optimum condition, and the processed image can be visually grasped; therefore, it becomes possible to obtain an optimum image for diagnosis easily.

(7) An image processing apparatus as set forth in (6), wherein the aforesaid image selecting means displays the image processing conditions applied to the aforesaid processed images together with said processed images.

Further, an image selecting method as set forth in (6), wherein the aforesaid image selecting means displays the image processing conditions applied to the aforesaid processed images together with said processed images.

According to these inventions, in addition to the above-mentioned (6), by making the image after practicing image processing and the image processing condition capable of being simultaneously grasped visually, the optimum image processing condition and processed image can be more easily selected.

BRIEF DESCRIPTION OF THE DRAWINGS

FIG. 8(a) and FIG. 8(b) are illustrations for the example 3 of the external contour of the radiographed region of a radiography object of an example of the embodiment of this invention;

FIG. 10(a) to FIG. 10(d) are drawings showing the shape of a filter for use in calculating the edge intensity information of an example of the embodiment of this invention;

FIG. 14 is a drawing showing how to select image processing in an example of the embodiment of this invention.

DETAILED DESCRIPTION OF THE PREFERRED EMBODIMENT

Figure 1:
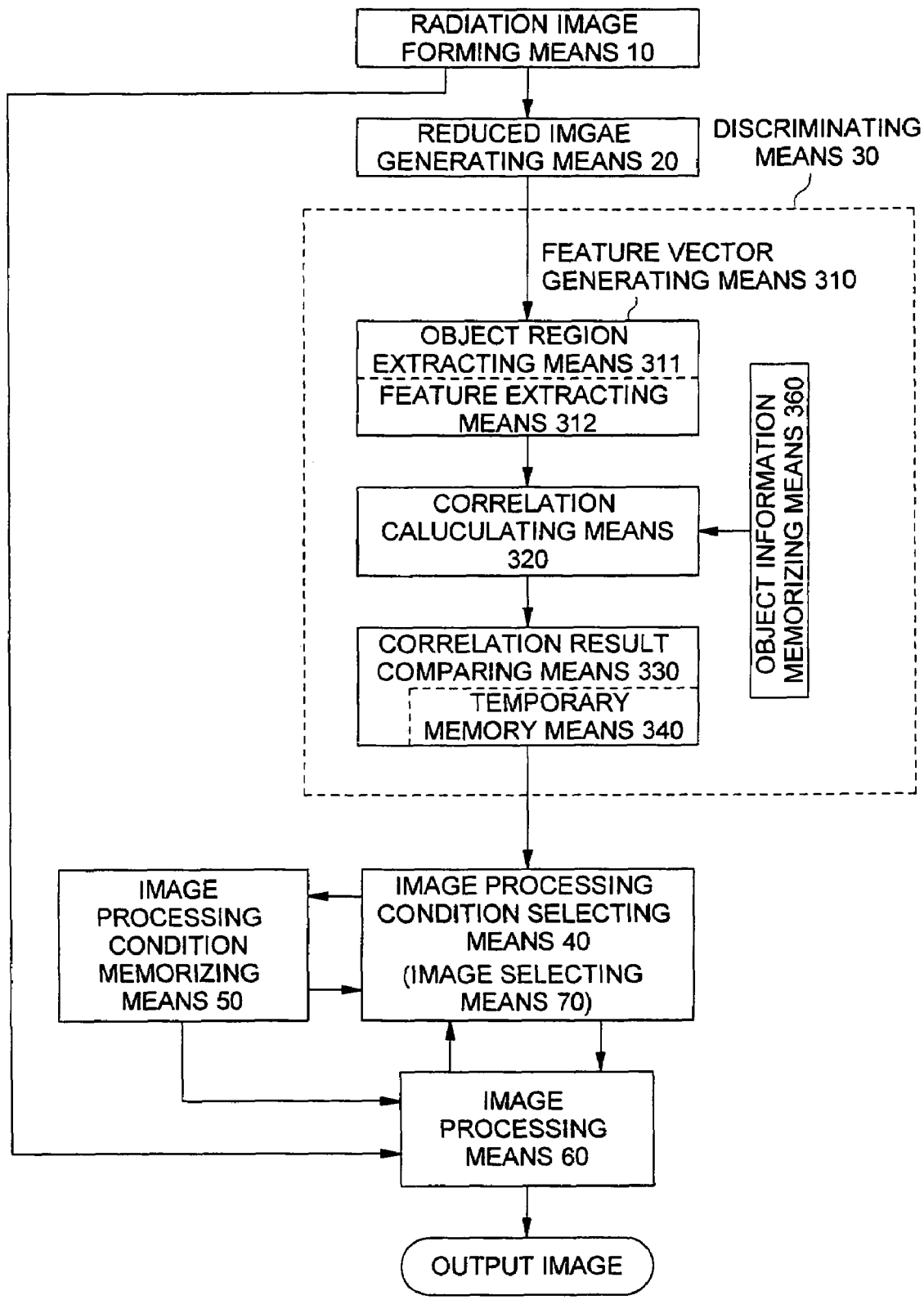
FIG. 1 is a functional block diagram showing the structure of an image processing apparatus of an example of the embodiment of this invention.

In the following, examples of the embodiment of this invention will be explained by referring to the drawings.

In the following, the structure and the operation of an image processing apparatus will be explained for each of the blocks on the basis of rough block-dividing.

As shown in FIG. 1, an image which is radiographed by the radiation transmitted through a radiography object by the radiation image forming means 10 is transmitted to the reduced image generating means 20. In the reduced image generating means 20, in order to make high the speed of the successive processes, a thinned image (reduced image) having its number of pixels reduced as compared to said radiation image is produced, and is transmitted to the discriminating means 30. In the discriminating means 30, the radiographed region of the object, the radiographing orientation, or the both of them are recognized by referring to this thinned-out image, and one or a plurality of pieces of the region information indicating regions considered as suitable ones respectively are transmitted to the image processing selecting means 40. In the image processing selecting means 40, the image processing conditions based on the obtained region information are read out from the image processing condition memorizing means 50, and presented to the user. Further, the image processing condition selected by the user out of the presented image processing conditions is transmitted to the image processing means 60, where processing for said radiation image is carried out on the basis of the obtained image processing condition, and an image which has been finally processed is outputted.

In addition, each of means in the image processing apparatus of this example of the embodiment can be composed of a hardware, a firmware, or a software. Therefore, a functional block diagram following the procedure of processing in each of the means is shown.

{1} Generation of Radiation Image:

As shown in FIG. 1, an image having signal values which are proportionate to the logarithm of the radiation amount applied is generated by the radiation image generating means.

For this radiation image generating means 10, such one that uses a sensor or the like such as the above-mentioned FPD or CCD, or an already known apparatus which generates a radiation image through reading a stimulable phosphor plate can be used. In addition, it is assumed that, in any case in this example of practice, signal values which are proportionate to the logarithm of the radiation amount applied are obtained, and the more the applied radiation amount is, the higher the signal value is.

Further, in order to shorten the time required for the processes after this, it is produced a thinned-out radiation image having its number of pixels reduced by sampling from the original radiation image by the reduced image generating means 20, and this thinned-out radiation image is transmitted to the discriminating means 30. In the case where the processing in the image processing apparatus is done at a high speed enough, or in the case where it is of no problem for the processing to take a long processing time, it is possible to transmit a radiation image which has not been subjected to thinning.

In addition, in the explanation of this example of the embodiment, it is assumed that the successive processes after this is carried out using a thinned-out radiation image.

It is desirable that the thinned-out radiation image has as small a number of pixels as possible, because the calculation time is shortened in the various kinds of processes. However, in this example of the embodiment, it is necessary that such an amount of information as to be able to discriminate the feature of a radiography object is provided. Therefore, in the case where a radiation image of original size has been obtained for each of regions of a human body, it is desirable that the pixel is made to have a size from 1 mm square to 5 mm square or so.

{2} Discrimination:

In the discriminating means 30, first, the radiation image which has been transmitted from the reduced image generating means 20 is analyzed. By doing this, the radiographed region (radiographed body part) of a radiography object and the radiographing orientation are discriminated. Further, as shown in FIG. 1, this discriminating means 30 contains in it the feature vector generating means 310 (the radiographed object region extracting means 311 and the feature extracting means 312), the correlativity calculating means 320, the correlation result comparing means 330 (the temporary memory means 340 included), and the radiography object information memorizing means 360.

First, in the feature vector generating means 310, the radiographed object region is extracted, and by using the label information of the extracted radiographed object region, a feature vector having a plurality of elements is generated and is sent to the correlativity calculating means 320.

In the correlativity calculating means 320, when a feature vector from the feature extracting means 312 is received, object vectors which have been memorized beforehand in the radiography object information memorizing means 320 are successively drawn out and the correlation operation with the feature vector is carried out. Further, each of the correlation values obtained from the result of the correlation operation by this correlativity calculating means 320 is transmitted to the correlation result comparing means 330.

In the correlation result comparing means 330, it is carried out the comparison between a threshold value which has been determined beforehand and each of the transmitted correlation values. If a correlation value is not smaller than said threshold value, the region information (the body part information) corresponding to the object vector concerned is memorized in the temporary memory means 340.

After the correlation operation with all of the object vectors has been finished, the region information memorized in the temporary memory means 340 is read out and transmitted to the image processing condition selecting means 40. If there is no region information memorized in the above-mentioned temporary memory means 340, particular region information which has been specified beforehand is transmitted to the image processing condition selecting means 40.

{2-1} Generation of a Feature Vector

First, the radiographed object region is extracted in the radiographed object region extracting means 311. Then, the label information indicating the extracted radiographed object region and the thinned-out radiation image are transmitted to the feature extracting means 312.

In the feature extracting means 312, a feature vector having a plurality of elements is generated by using the label information of the extracted radiographed object region. In addition, regarding a feature vector, an explanation will be given later. Then, the feature extracting means 312 transmits the obtained feature vector to the correlativity calculating means 320.

Figure 2:
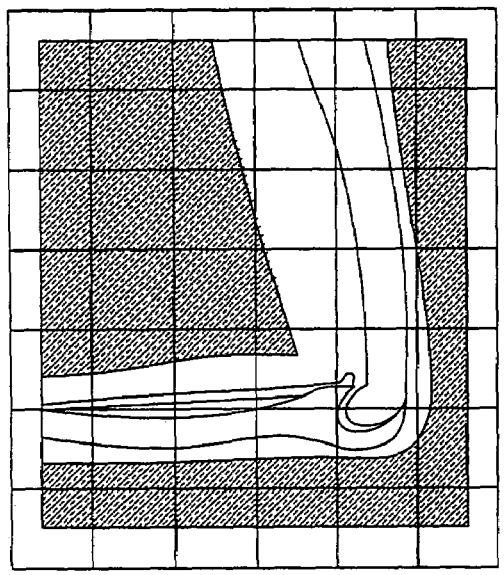
FIGS. 2(a) to 2(d) are illustrations showing how to extract a domain of a radiography object in an example of the embodiment of this invention.
Figure 2:
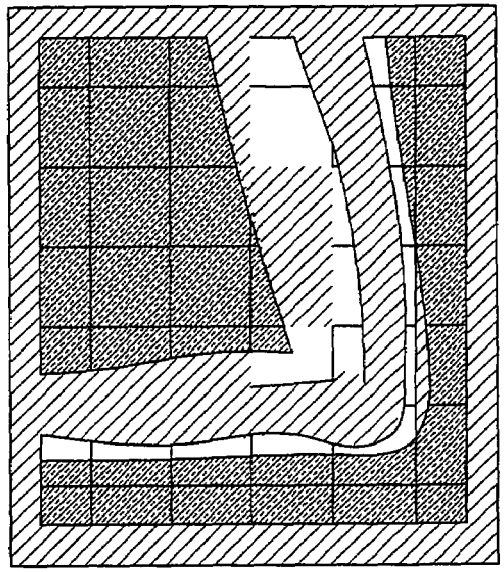
Figure 2:
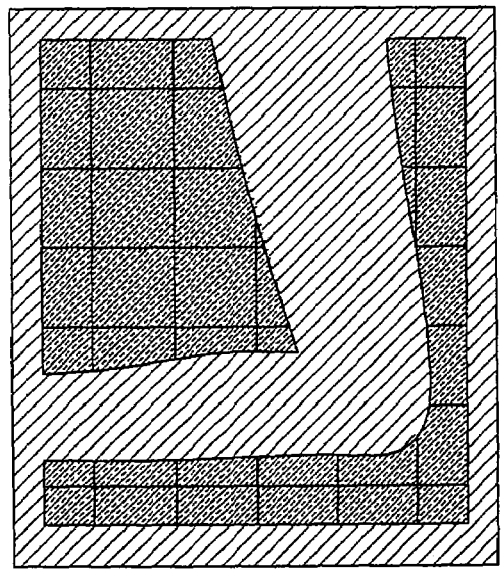
Figure 2:
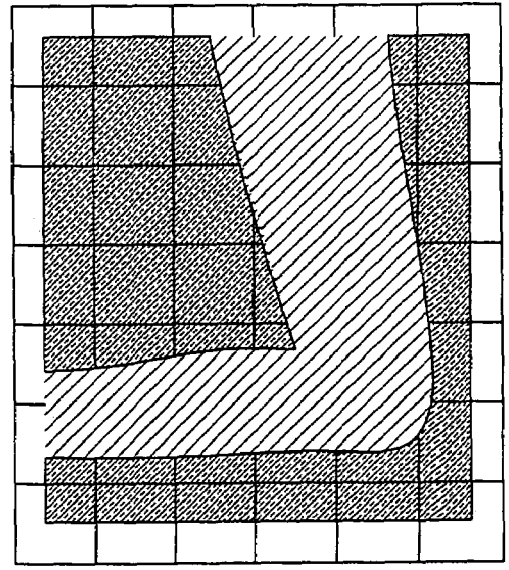

{2-1-1} Extraction of a Radiographed Object Region:

Now, the radiographed object region extracting means 311 carries out the extraction of the radiographed object region as will be explained below (refer to FIG. 2).

{2-1-1-a} The image is divided into plural small regions (FIG. 2(a)).

{2-1-1-b} In each of the small regions, an average signal value of the pixel signal values included in said small region is obtained as a threshold value Th1.

{2-1-1-c} For each of the small regions, pixels having a signal value lower than the threshold value Th1 are detected as the radiographed object region (FIG. 2(b)).

{2-1-1-d} The average signal value of the radiographed object region obtained in each small region is obtained and is made the threshold value Th2.

{2-1-1-e} Over the whole image, pixels having a signal value lower than the threshold value Th2 are detected as the radiographed object region (FIG. 2(c)).

{2-1-1-f} In order to remove the outside region of an irradiation field from the detected radiographed object region, the border lines of the outside region of the irradiation field are obtained, and the portion between the border lines and the nearer image edges is removed as an outside region of the irradiation field (FIG. 2(d)).

{2-1-1-g} The border lines of the outside region of the irradiation field are obtained in the following way. First, pixels positioned at the border of the radiographed object region are detected as border points. Then, a straight line on which a number of border points in the same direction are arrayed is detected as a line considered as suitable one for the border lines. With respect to the line considered as suitable one for the border lines, an equation of a straight line is calculated from two arbitrary border points, and if the number of border points existing on the straight line is not smaller than a specified threshold value Th3, it is detected as the suitable one for the border lines. Further, in the case where the portion between the suitable line for the border and the image edge is almost the radiographed object region, the suitable line for the border is regarded as one of the border lines of the outside region of the irradiation field and the radiographed object region from it to the image edge is eliminated as an outside region of the irradiation field.

The radiographed object region information indicating the radiographed object region which has been obtained by the respective means (respective steps) of the above-mentioned {2-1-1-a} to {2-1-1-g} is given as a domain indicating image having the same size as the thinned-out image having been obtained by the reduced image forming means 20 (the original image in the case where the image obtained from the radiation image forming means 10 is used directly), in which pixels outside the radiographed object region are set at the pixel value '0', pixels included in the radiographed object region are set at the pixel value '1', and pixels positioned on the above-mentioned border lines of the outside region of the irradiation field (edges of the irradiation field) are set at the pixel value '2'.

Further, as a method of carrying out the extraction of a radiographed object region by the radiographed object region extracting means 311, in addition to the above-mentioned procedure explained in {2-1-1-a} to {2-1-1-g}, a method to be shown in the following {2-1-1-h} and {2-1-1-i} can be considered.

{2-1-1-h} After the outside region of the irradiation field is detected by the method which is described in the publications of the unexamined patent application S63-259538, S63-244029, and H5-7579, signal values corresponding to the domain which has been directly irradiated by radiation are found out from the shape of the histogram of the pixel signal values in the irradiation field domain, and the residual irradiation field domain after the domain corresponding to the above-mentioned signal values is removed is made the radiographed object region. With respect to the detection of the above-mentioned signal values corresponding to the directly irradiated domain by radiation, it is made possible by the following procedure: that is, by means such as discrimination analysis for example, a threshold value between a high signal domain indicating the directly irradiated domain and a low signal domain having a lower signal than that owing to the transmission through a radiography object is obtained in the above-mentioned histogram, and a domain having a higher signal than said threshold value is regarded as the directly irradiated domain.

{2-1-1-i} Further, in order to avoid the influence by the heel effect, an unevenness caused by the radiation image forming means, etc., for the detection of the threshold value for removing the above-mentioned directly irradiated region, it is possible to use a method, in which it is produced a histogram of pixel signal values for each of the plural block-wise domains formed, for example, by dividing an image into four portions through dividing into the upper and lower portions, and dividing into left and right portions, and means such as discrimination analysis is used as described in the above.

The radiographed object region information indicating the radiographed object region which has been obtained by the means of the above-mentioned {2-1-1-h} or {2-1-1-i} is given, in the same way as the case of it being obtained by the means shown in the procedure {2-1-1-a} to {2-1-1-g}, as a domain indicating image having the same size as the thinned-out image which has been obtained by the reduced image forming means 20 (the original image, in the case where the image obtained from the radiation image forming means 10 is used directly), in which pixels outside the radiographed object region are set at the pixel value '0', pixels included in the radiographed object region are set at the pixel value '1', and pixels positioned on the above-mentioned border lines of the outside region of the irradiation field (edges of the irradiation field) are set at the pixel value '2'.

In the case where the radiographed object region is composed of a plurality of domains which are not connected to one another, only the largest domain among them is extracted. With respect to the calculation of the number of the radiographed object regions and the classification of the domains, for example, labeling processing which has been heretofore often used can be utilized. In the case where the radiographed object region is classified into a plurality of domains in this way, the numbers of pixels included in the respective domains are counted, and only the domain having the largest number of pixels is made the radiographed object region anew, while the radiographed object region information is renewed.

In this way, the radiographed object region information obtained by the respective steps of the above-mentioned {2-1-1-a} to {2-1-1-g}, {2-1-1-h}, or {2-1-1-i} in the radiographed object region extracting means 311 is transmitted to the feature extracting means 312 together with the above-mentioned thinned-out image.

{2-1-2} Feature Extraction:

In the feature extracting means 312, a plurality of features are extracted mainly from the radiographed object region, and each of them is denoted by the element of the feature vector Cj (j=1, 2, - - - , m). For the features to be extracted, the size of the radiographed object region, the shape, the shape of the density profile, the shape of the center line of the radiographed object region, the distribution of edges based on the first order derivative, or second order derivative derived from the neighborhood pixels, strength or weakness of the variance value of the signal values in each of the local regions, etc. can be cited.

The value of each element Cj is memorized as a vector value on the basis of a predetermined condition. For example, assuming that the element Cs of the feature vector denotes the "external contour (outline) of a radiography object", and it is classified into any one of the three types of "rectangle type", "barrel type", and "sandglass type", Cs is made a vector having the three elements (e0, e1, e2). Each of the elements ek (k=0, 1, 2) is made to correspond to each of the "rectangle type", "barrel type", and "sandglass type". Then, if the shape is judged as nearly rectangular like a forearms or a femur, Cs is expressed by Cs=(1, 0, 0), and if it is judged as nearly cask-shaped, Cs is expressed in such a manner as Cs=(0, 1, 0).

Figure 3:
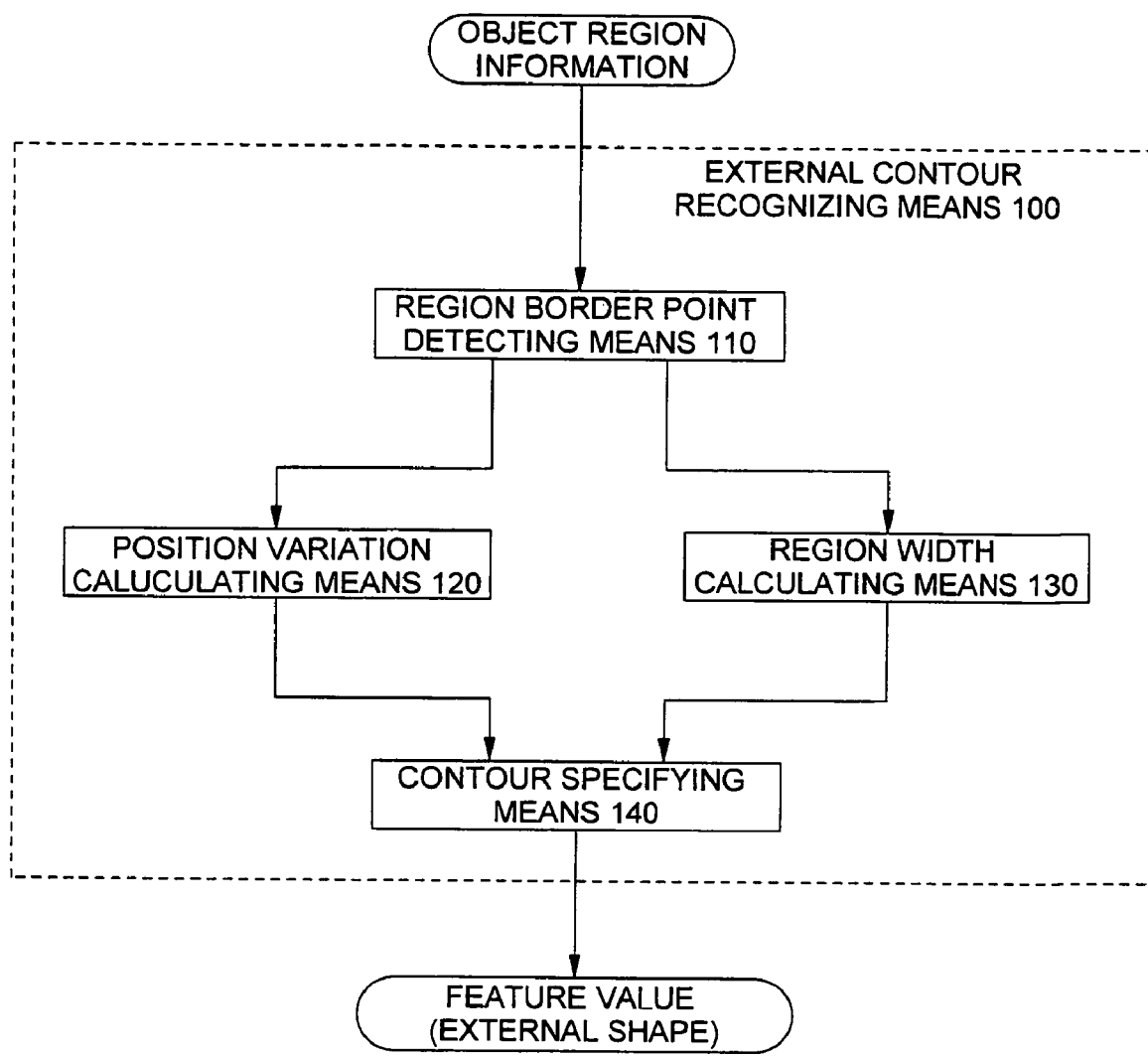
FIG. 3 is a flow chart of the external contour recognizing means of an example of the embodiment of this invention.

In this example of practice, explanations will be given by assuming that the features to be used are "the external contour of the radiographed object region" and "the spatial distribution of edges", and the feature vector P has the elemental vectors C0 and C1 based on those features. In the following, the external contour recognizing means 100 (refer to FIG. 3) and the edge distribution recognizing means 200 (refer to FIG. 9) will be explained.

{2-1-3} Recognition of External Contour:

In the external contour recognizing means 100 for carrying out the recognition of an external contour, by using the variation of the contour of the radiographed object region and the information on the width of the radiographed object region, the external contour of the radiographed object region is recognized, and the radiographed object region is classified into several types depending on the external contour recognized. The result of classification is outputted as a feature amount (features).

First, the radiographed object region information is inputted in the region border point detecting means 110, and a plurality of region border points expressing the contour of the radiographed object region are obtained. The obtained region border points are transmitted to the position variation calculating means 120 for calculating the local variation of position of the contour, and the region width calculating means 130 for obtaining the width of the radiographed object region. In the position variation calculating means 120, the size and position of the concavity or convexity of the contour are obtained, and in the region width calculating means 130, the local width of the radiographed object region is obtained along a plurality of scan lines drawn across the radiographed object region. These kinds of information are transmitted to the contour specifying means 140, where the external contour of the radiographed object region is specified on the basis of these bits of information. Then, the feature amount is outputted on the basis of the specified external contour.

Figure 4:
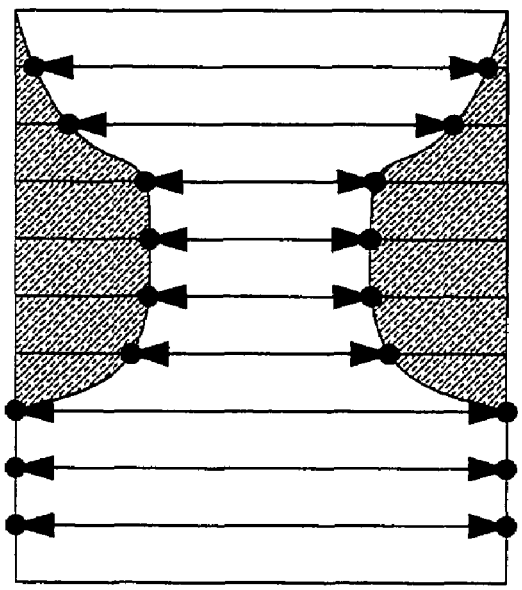
FIG. 4 is an illustration of the detection of the border points of a domain of an example of the embodiment of this invention.

{2-1-31} Detection of Region Border Points:

The region border point detecting means 120 carries out following processing. As shown in FIG. 4, first, for a region indicting image which indicates the radiographed object region information, a plurality of different scan lines scanning the image sequentially from one edge to the other edge in the horizontal direction at equal intervals are set.

Further, on each of the scan lines, pixel values are checked successively one by one as moving from the left edge of the image to the right side, and the pixel at a position where the pixel value varies from '0' to '1' or from '2' to '1' is detected as a region border point (left). After that, pixel values are checked on the same scan line successively one by one as moving from the right edge to the left side this time, and the pixel at a position where the pixel value varies from '0' to '1' or from '2' to '1' is also detected as a region border point (right). If the pixel value at an image edge is '1', the pixel at the image edge on the scan line is made a region border point. For each of the detected region border points, the coordinate values and the information indicating which the border point belongs to, (left) or (right), are transmitted to the position variation calculating means 120 and the region width calculating means 130.

{2-1-3-2} Calculation of Amount of Position Variation:

With respect to the region border points obtained by the above-mentioned region border point detecting means 110, the position variation calculating means 120 calculates the difference of the horizontal coordinate value between the neighboring region border points is calculated for each of the (left) and (right) groups.

Next, from the above-mentioned difference of the horizontal coordinate value, with respect to the horizontal coordinate for each of the above-mentioned groups, the maximum point where the shape of the radiographed object region becomes 'convex' (in the case of (left) group, it corresponds to the point where the horizontal coordinate locally comes to the extremely left side, and in the case of (right) group, it corresponds to the point where the horizontal coordinate locally comes to the extremely right side) and the minimum point where the shape of the radiographed object region becomes 'concave' (in the case of (left) group, it corresponds to the point where the horizontal coordinate locally comes to the extremely right side, and in the case of (right) group, it corresponds to the point where the horizontal coordinate locally comes to the extremely left side) are obtained.

Further, regarding these extreme points (the maximum point and the minimum point), the degree of concavity or convexity in the neighborhood of them is studied. The position of the extreme point and the degree of concavity or convexity are calculated in the following way.

The explanation given below can be applied to the (left) group and the (right) group similarly; therefore, explanation will be given only for one of the groups.

{2-1-3-2a} Detection of the Position of an Extreme Point:

With respect to the region border points other than those existing at the uppermost or the lowermost portion of the radiographed object region, the following processes are carried out successively from the upper side of the radiographed object region.

The difference value of the horizontal coordinate s1 between the region border point concerned (the region border point other than those existing at the uppermost or the lowermost portion of the radiographed object region) p0 and the neighboring region border point p1 existing at the upper side of p0 is obtained. In the same way, the difference value of the horizontal coordinate s2 between the region border point p0 concerned and the neighboring region border point p2 existing at the lower side of p0 is obtained.

Next, the sign of s1×s2 is checked, and if it satisfies a specified condition, the extreme point is detected.

If s1×s2<0, said region border point p0 is regarded as an extreme point.

If s1×s2=0 and only one of sj (i=1, 2) is '0', the difference values of horizontal coordinate between p0 and the object border points existing in the neighborhood of it are calculated successively in the order from the nearest to the farther point to the direction in which the difference value is '0' (upper or lower direction). Then, when the difference value takes a value other than '0' for the first time, the difference value is made sj anew. Further, s1×s2 is again calculated. At this time, if s1×s2<0, the middle point between the above-mentioned p0 and the region border point where sj takes a value other than '0' for the first time is made an extreme point.

{2-1-3-2b} Degree of Concavity or Convexity:

Now, the degree of concavity or convexity will be explained by referring to FIG. 5. First, the difference value of the horizontal coordinate between neighboring region border points are successively checked from the extreme point to the upper side, and a point "a" where the difference value becomes of reverse sign to the difference value in the upper neighborhood of the extreme point or '0' is obtained. Further, in the same way, the difference value of the horizontal coordinate between neighboring region border points are successively checked from the extreme point to the lower side, and a point "b" where the difference value becomes of reverse sign to the difference value in the lower neighborhood of the extreme point or '0' is obtained. Regarding such points "a" or "b", if a point where the difference value becomes of reverse sign to that in the neighborhood of the extreme point cannot be found, the points having the uppermost vertical coordinate and the lowermost vertical coordinate in the area where the object exists are made the point "a" and the point "b" respectively. The difference between the average value of the horizontal coordinate of these points "a" and "b" and the horizontal coordinate value of the extreme point concerned is regarded as the depth (refer to FIG. 5), and the difference of the vertical coordinate value between the points "a" and "b" is regarded as the width (refer to FIG. 5), and each of them is made an index expressing the degree of concavity or convexity. Further, as a method of obtaining the above-mentioned points "a" and "b", instead of using the difference value as the basis, it is appropriate to use the second order derivative value of the horizontal coordinate as the basis. Here, also in the case where the second order derivative value is used as the basis, a point where the second order derivative value becomes of reverse sign to that in the neighborhood of the extreme point or '0' is made the point "a" or the point "b".

In studying this degree of concavity or convexity, it is desirable to do such a contrivance as to enlarge the distance between the region border points for calculating the above-mentioned difference value to some extent so as not to make an error in detecting the variation on the whole by detecting minute variations. For example, there is such a method as to use only the region border points positioned on the lines to divide the length of the radiographed object region in the vertical direction (the direction perpendicular to the scan lines in detecting the region border points) into 10 to 30 equal portions, or as to obtain an average horizontal coordinate value of plural neighboring region border points, to obtain the above-mentioned difference value on the basis of the average horizontal coordinate value.

Figure 5:
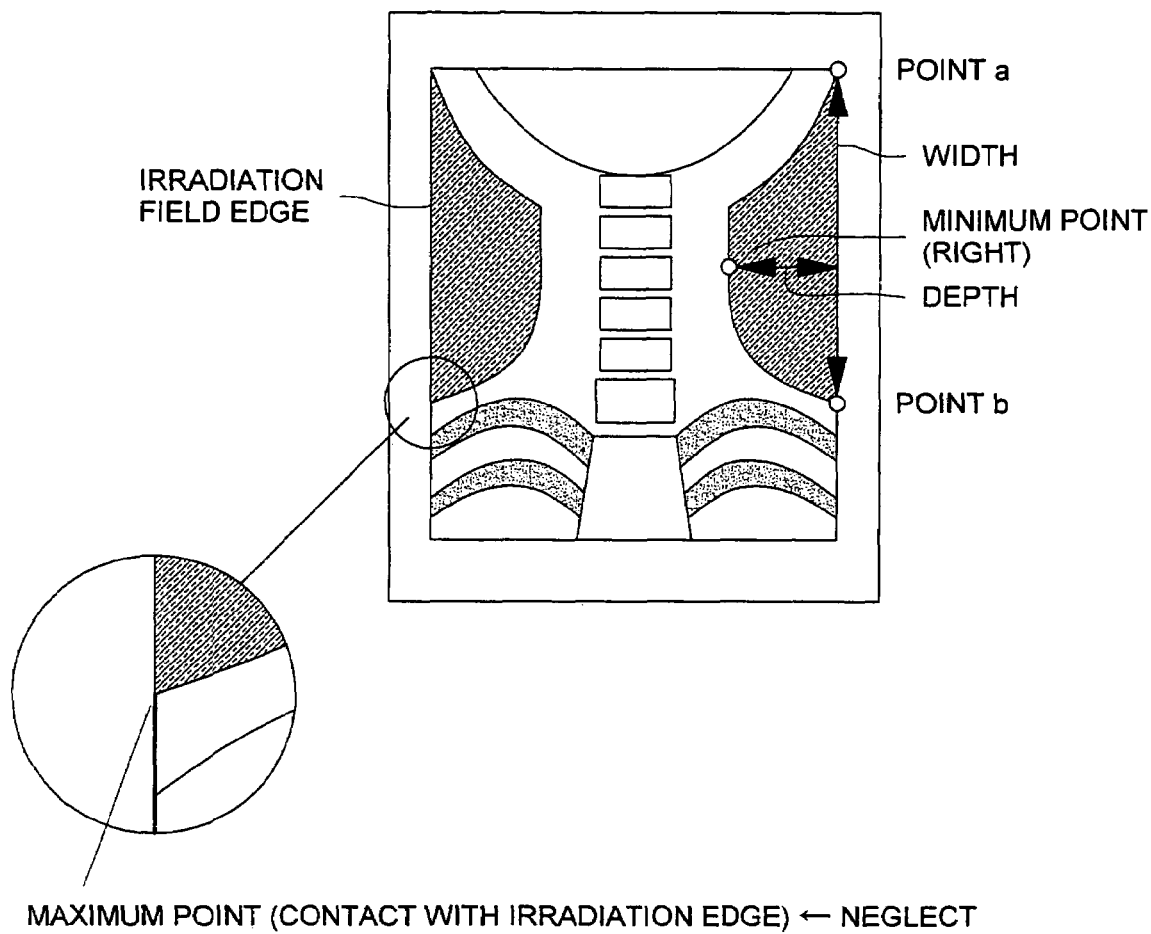
FIG. 5 is an illustration of the positional variation amount information of an example of the embodiment of this invention.
Figure 6A:
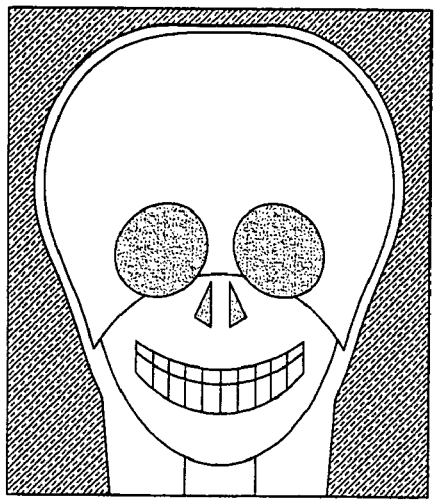
FIG. 6(a) and FIG. 6(b) are illustrations for the example 1 of the external contour of the radiographed region of a radiography object of an example of the embodiment of this invention.
Figure 6A:
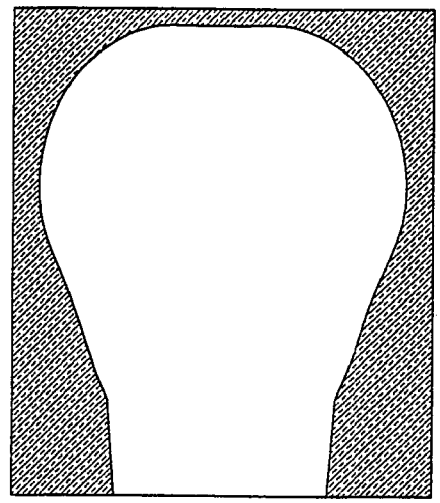
Figure 6B:
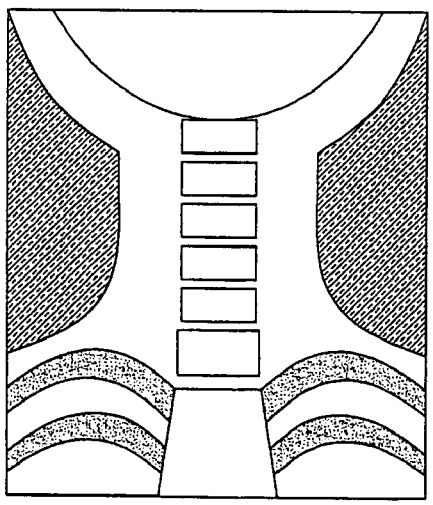
Figure 6B:
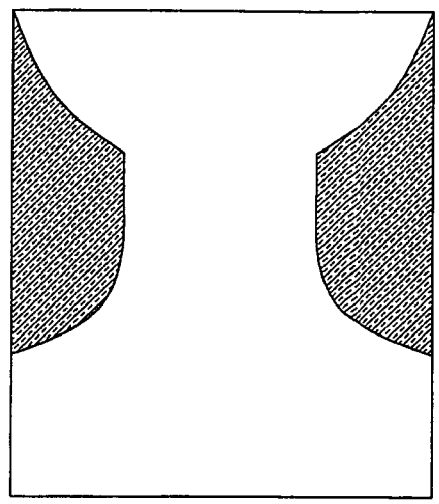

Further, at a position where the radiographed object region meets the edge of the irradiation field, it sometimes occurs that the radiographed object region is made to have a convex shape, which is different from the original shape of the object (refer to the enlarged drawing in FIG. 5). Therefore, in the case where the extreme point is a maximum point and the radiographed object region meets the edge of the irradiation field, this extreme point is to be regarded as not detected, and its depth and width are both made '0'.

In the above-mentioned cases, the judgment whether the radiographed object region meets the edge of the irradiation field or not is done in the following way. That is, at a plurality of region border points which are located in either the upper or lower neighborhood of an extreme points, if there is a pixel having the pixel value '2' of the domain indicating image, which indicates an edge of the irradiation field, within a range of a specified distance (from one pixel to three pixels or so), it is judged that the radiographed object region meets an edge of the irradiation field. Moreover, in the case where the radiographed object region meets an edge of the image, the point is treated in the same way.

Among the extreme points determined in the above-mentioned manner, one that has a large degree of concavity or convexity is generally regarded as one of points representing the external contour. Therefore, for each of the above-mentioned (left) and (right) groups, only a specified number of points (desirably 1 to 3) are extracted in the order of the absolute value of the depth in which the largest one comes first, a set of information on the position of the extreme point, concavity or convexity, the depth, and the width is made the positional variation amount information.

Further, in the same way as the above-mentioned positional variation of the object in the horizontal direction, extreme points are obtained for the positional variation in the vertical direction, and both sets of positional variation amount information are transmitted to the contour specifying means 140.

{2-1-3-3} Calculation of the Region Width:

In the region width calculating means 130, it is obtained the distance between the border points which are located on the same scan line among the above-mentioned region border points. The obtained distances, together with the coordinate values of the scan line in the vertical direction, are transmitted as the region width information to the contour specifying means 140.

{2-1-3-4} Contour Specifying:

In the contour specifying means 140, the external contour is specified from the positional variation amount information and the region width information obtained, by classifying it into a plurality of patterns prepared beforehand. The external contour of a human body in radiography has a feature which is different depending on the region to be the radiography object. To take the head image as shown in FIGS. 6(*a*) and 6(*b*) for instance, when the sets of the positional variation amount information obtained from the (left) and (right) groups respectively are studied from the upper edge of the image to the lower edge side, both make variation such that the border points come closer to the left edge and right edge of the image midway respectively, and later, both make variation such that the border points go away from the image edges; therefore, the external contour can be classified as "barrel type". Further, in the neck image as shown in FIGS. 6(*c*) and (*d*), it is found out that, on the contrary, both border lines make variation such that the border points go away from the image edges midway respectively, and later both come closer to the image edges respectively. In such a case as this, the external contour can be classified as "sandglass type".

Figure 7:
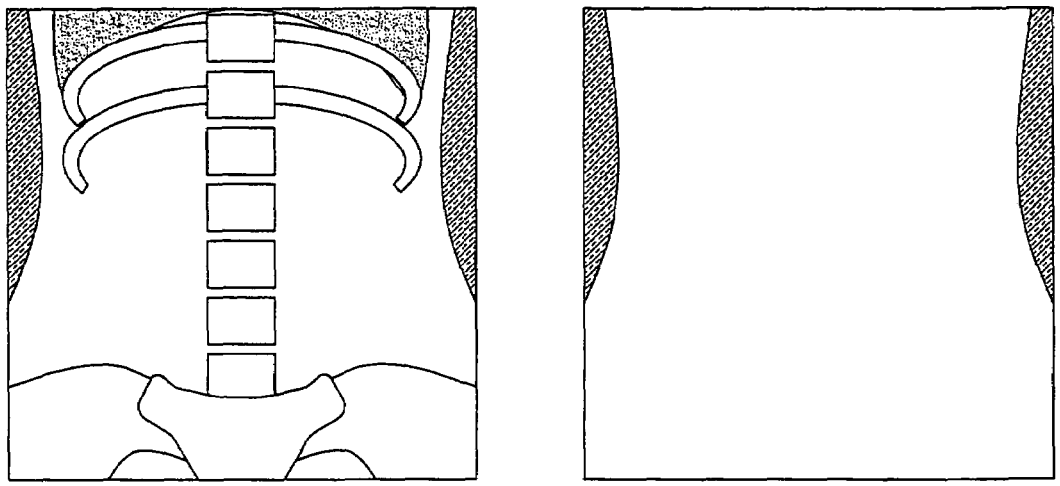
FIG. 7(a) and FIG. 7(b) are illustrations for the example 2 of the external contour of the radiographed region of a radiography object of an example of the embodiment of this invention.
Figure 7:
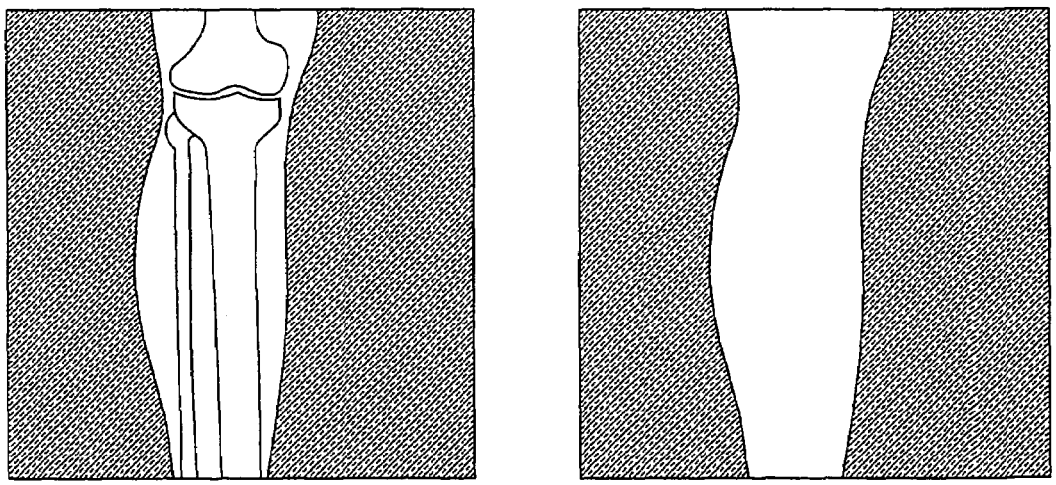

Further, with respect to the abdomen image as shown in FIGS. 7(*a*) and 7(*b*), and the lower limbs image as shown in FIGS. 7(*c*) and 7(*d*), the positional variation of the region border point in the horizontal direction is not so much, and both have approximately rectangular external contour; however, by using the region width information, both can be classified as "square type" and "rectangle type" respectively, because the abdomen image has a broad width, while the lower limbs image has a narrow width.

Further, in the knee joint image as shown in FIGS. 8(*a*) and 8(*b*), because the joint portion has a shape having a crook midway, it can be classified as "boomerang type". A classification including, in addition to the above-mentioned, "fan type" for the shoulder joint, "ramification type" for the hand fingers, "single side-convex type" for the heel, "reverse triangle type" for the clavicle, etc. can be thought of.

{2-1-3-4a} Detailed Explanation of the Example of Classification:

By using the above-mentioned positional variation amount information and the region width information, the external contour of a radiography object is classified as a shape considered most suitable among the several patterns shown in the above.

{2-1-3-4a(1)} Condition of Classification as Barrel Type:

For example, the condition for classifying a shape as "barrel type" is defined in the following way.

The broadest extreme point is convex for each of the (left) and (right) groups;

The position of both of the above-mentioned extreme points is in the central part of the three parts formed by dividing the radiography object into three parts in the vertical direction;

The depth of each of the above-mentioned two extreme points is not less than 20% of the average width of the object in the horizontal direction.

{2-1-3-4a(2)} Condition of Classification as Sandglass Type:

In the same way, the condition for classifying a shape as "sandglass type" is defined in the following way.

The broadest extreme point is concave for each of the (left) and (right) groups;

The position of both of the above-mentioned extreme points is in the central part of the three parts formed by dividing the radiography object into three parts in the vertical direction;

The sum of the depth of each of the above-mentioned two extreme points is not less than 20% of the average width of the object in the horizontal direction.

{2-1-3-4a(3)} Condition of Classification as Boomerang Type:

The broadest extreme point is convex for one and concave for the other of the (left) and (right) groups;

The depth of each of the above-mentioned two extreme points is not less than 10% of the average width of the object in the horizontal direction.

{2-1-3-4a(4)} Condition of Classification as Squar Type, Rectangle Type:

Further, the condition for classifying a shape as "square type" or "rectangle type" is defined in the following way.

The depth of the extreme point having the largest depth is less than 10% of the average width of the object in the horizontal direction for each of the (left) and (right) groups.

If the ratio of the length of the object in the horizontal direction to the length in the vertical direction is less than 2 with the shorter one taken as the basis, it is classified as "square type";

If the ratio of the length of the object in the horizontal direction to the length in the vertical direction is not less than 2 with the shorter one taken as the basis, it is classified as "rectangle type".

In addition, each of the conditions of classification shown in the above concrete examples is only one example, and some other kinds of conditions can be considered.

{2-1-3-4b}

As explained in the above, the external contour is classified into several patterns by the positional variation amount information and the region width information. The result of the classification is outputted as the feature amount which is finally obtained. The result of this output is memorized as associated with the each element of the elemental vector C0 of the above-mentioned feature vector P. The shape vector S is expressed by it that only the element corresponding to the result of the above-mentioned classification takes a value other than '0'. For example, the number of the element corresponding to each of "barrel type", "sandglass type", "boomerang type", "square type", "rectangle type", and "other", is set at '0', '1', '2', '3', '4', and '5'. Then, if the result of the classification is "barrel type", C0[0]=1 is put, and if it is "sandglass type", C0[1]=1 is put; both are memorized. In this way, this elemental vector C0 is outputted as the feature amount from the contour specifying means 140.

{2-1-3-4c} Basis of the Discrimination of Classification:

Further, in some cases it is difficult to classify the shape simply as a certain type among them.

Therefore, it is appropriate to carry out weighting on the feature amount corresponding to each of the patterns that can be somewhat suitable for the shape, to output the result. In this case, setting is done in a manner such that a plurality of elements of the above-mentioned elemental vector C0 is made to have a value other than '0', and the sum of the values of the elements becomes a constant value ('5' for example). Besides, the values are allotted in such a way that an element corresponding to a shape of the higher degree of certainty has the larger value.

For example, in the case where the condition for the depth is not satisfied by only a little amount in the above-mentioned basis of the discrimination for the "sandglass type", that is, the sum of the depth values of the extreme points is only 18%, for example, of the average width of the object in the horizontal direction, it is delicate that the shape should be classified as "square type" or "sandglass type". In such a case as this, values are allotted to the element of the elemental vector C0 representing the "sandglass type" and the element representing the "square (rectangle) type".

In this case, as an example of allotment, if the sum of the depth values is not larger than 10%, it is set that the element representing the "square type" C0[3(4)]=5, the element representing the "sandglass type" C0[1]=0, and for every increment of the above-mentioned sum of the depth value by 2%, the value of C0[3(4)] is reduced by '1', and on the contrary, the value of C0[1] is increased by '1'.

Also in the cases other than this example of the "sandglass type" and "square (rectangle) type", that is, between the "barrel type" and "square (rectangle) type", the "square type" and "rectangle type", the "boomerang type" and "square (rectangle) type", etc., a basis of the discrimination of classification similar to the one shown in the above can be applied.

Figure 9:
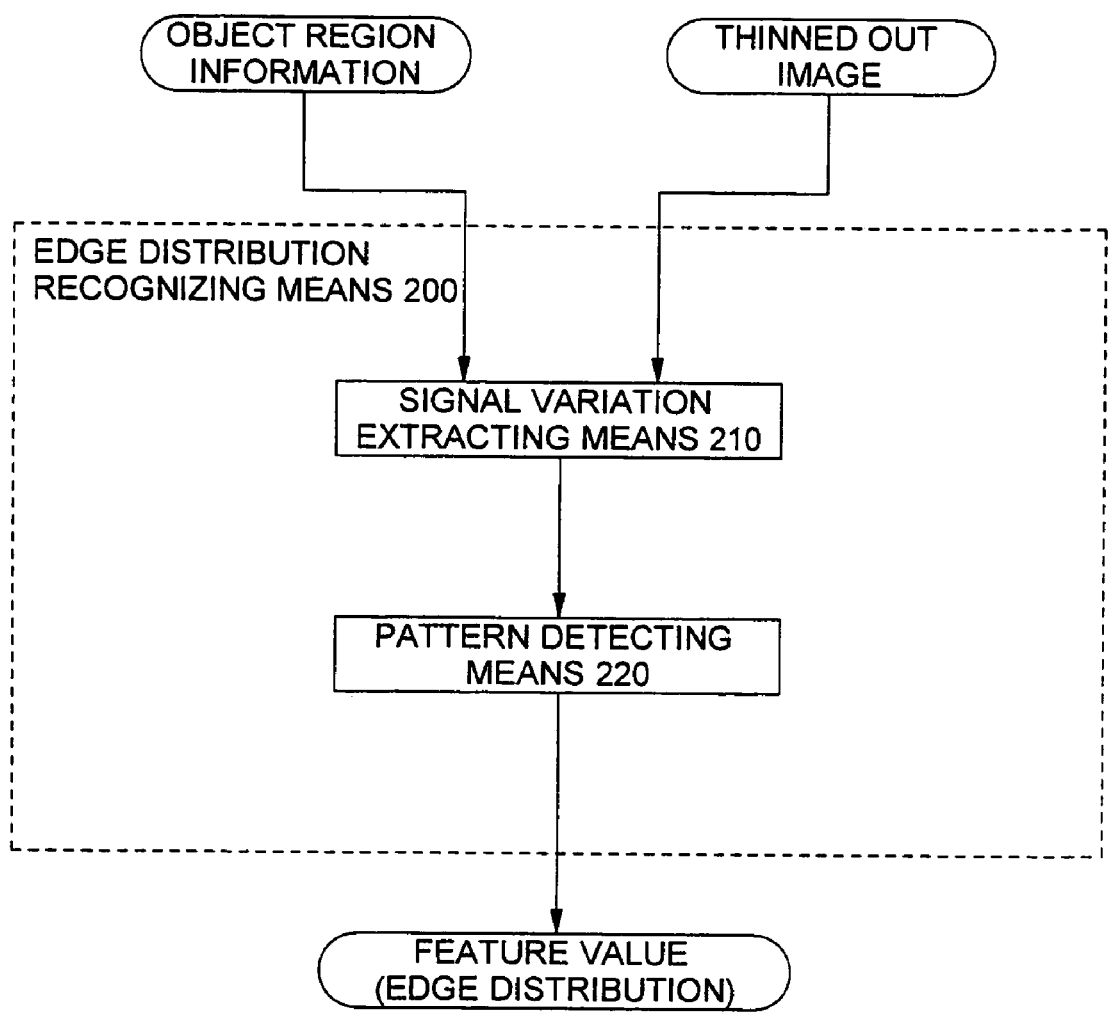
FIG. 9 is a flow chart of the edge distribution recognizing means of an example of the embodiment of this invention.

{2-1-4} Recognition of Edge Distribution:

As shown in FIG. 9, the following processing of the recognition of edge distribution is carried out by the edge distribution recognizing means 200.

{2-1-4-1} Extraction of Signal Variation:

The signal variation extracting means 210 carries out the extraction of signal variation (for example, the extraction of an edge in a bone region) as will be explained in the following.

In this example of the embodiment, in order to extract an edge of a bone region or the like especially, an operation process equivalent to second order differential is practiced.

An operation process is practiced for the density of every pixel $P(x, y)$ (x: horizontal coordinate value, y: vertical coordinate value) of the above-mentioned thinned-out image using four kinds of filters as shown in FIGS. 10(*a*) to 10(*d*).

Now, the edge intensity information $Q(x, y)$ obtained as the result of the operation of every pixel $P(x, y)$ is expressed by the following equation:

[M1]

$$Q(x, y) = a\text{-max}(\Sigma\Sigma P(x+i, y+j) Mn_{ij}),$$

where $Mn_{ij}$ represents each of the values in each filter (n=1, 2, 3, 4).

Further, a-max( ) indicates the maximum value to be obtained by comparing the absolute value of the result of the operation using the above-mentioned filters.

Moreover, the value of $Mn_{ij}$ for each pixel is the value noted in each square of the filters shown in FIG. 10.

Further, in practicing the above-mentioned operation at an end portion of an image, in the case where a pixel whose density is to be multiplied by the filter value is located out of the image area and does not exist, the operation process is carried out through virtually substituting the density value of the central pixel of the filter operation for the density value of the pixel that comes out of the image area.

Further, the edge direction information $D(x, y)$ is given by $$D(x, y) = n,$$

where n is corresponding to the number of the filter which has been selected by the above-mentioned operation process for a-max( ), and it is memorized for each of pixels. The edge direction information $D(x, y)$ becomes an index indicating the direction of the edge at the pixel. For example, when n=1, the direction of the edge is horizontal, and when n=2, the direction of the edge is vertical.

At pixels having important information such as an edge in a bone region, signal variation between neighboring pixels is large. Therefore, by extracting the pixels having a high edge intensity from the above-mentioned edge intensity information $Q(x, y)$, important edge information can be obtained.

Therefore, the values of the above-mentioned $Q(x, y)$ are calculated over the whole image, and it is discriminated if the value of $Q(x, y)$ falls within the range of $\alpha\%$ of the whole arranged in the order of the value of $Q(x, y)$, in which the largest one comes first, and the result is stored in the edge selection information $L(x, y)$, where $L(x, y)$ is expressed by the following values:

$$L(x, y) = 1,$$

(in the case where the value of $Q(x, y)$ falls within the range of $\alpha\%$ of the whole arranged in the order of the value of $Q(x, y)$, in which the largest one comes first)

$$L(x, y) = 0.$$

(in the case where the value of $Q(x, y)$ does not fall within the range of $\alpha\%$ of the whole arranged in the order of the value of $Q(x, y)$, in which the largest one comes first)

It is desirable that the above-mentioned $\alpha\%$ is from 5% to 40% in order to obtain necessary edge information correctly.

Further, in order to obtain specified edge information with enhancement put on it, it is appropriate to refer to the density value of each pixel itself. For example, because a bone part absorbs more amount of radiation than a soft part, its density value becomes relatively low. Therefore, if the above-mentioned $L(x, y)=1$ only for pixels whose $P(x, y)$ is lower than a specified value such as an average value of the whole image or an radiographed object region obtained by a method to be described later, the edge corresponding to the border of a bone part can be detected preferentially.

On the contrary, if the above-mentioned $L(x, y)=1$ only for pixels whose $P(x, y)$ is larger than the above-mentioned specified value, the signal variation in the lung field, the border between a radiography object and the directly irradiated region which is irradiated directly by radiation, etc. can be detected preferentially. Each of the edge direction information $D(x, y)$, the edge selection information $L(x, y)$, and the edge intensity information $Q(x, y)$ obtained in this signal variation extracting means 210 is transmitted to the pattern detecting means 220.

{2-1-4-2} Pattern Detection:

In the pattern detecting means 220, one or a plurality of patterns are detected from the edge direction information $D(x, y)$, the edge selection information $L(x, y)$, and the edge intensity information $Q(x, y)$ obtained.

When radiography is made with a human body put as a radiography object, the radiograph has a feature pattern depending on the region to become the object and the radiographing orientation. To take it for instance the case where bones of limbs such as the image of the leg region shown in FIGS. 11(*a*) and 11(*b*) are made the radiography object, an edge (the portion shown with enhancement by the heavy line in FIGS. 11(*a*) and 11(*b*)) having a relatively high intensity and a component in the direction perpendicular to the border line exists continuously along the border line of a bone. Such a continuous edge in the same direction appears in not only the bones of limbs but also in the contour of the lung field, the contour of a jawbone (FIG. 12(*b*)), etc. likewise.

Further, as the image of the lumbar shown in FIG. 12(a), in the case where the spine is the main radiography object, because the spine is composed of small bones assembled, edges having a high intensity are concentrated in the spine part, but the directions of those edges are not unified.

Therefore, as shown in the following, by carrying out the extraction of "patterns" such as "a continuous edge having the same direction" (appearing in the bones of limbs, contour of the lung field, etc.), and "a line of concentrated edges without directivity" (appearing in the spine part), information that is useful for recognizing the region of the radiography object can be obtained.

{2-1-4-2a} Pattern 1: Extraction of a Continuous Edge Having the Same Direction:

{2-1-4-2a-1} In the target pixel $I(x, y)$ for which $L(x, y)=1$, if the both adjacent pixels $I(i, j)$ and $I(k, l)$ that are adjacent to it in the direction perpendicular to the edge direction indicated by $D(x, y)$ have an edge component in the same direction and $L(i, j)=1$, $L(k, l)=1$ in the same manner as $I(x, y)$, the value of $L(x, y)$ is increased by '1'.

{2-1-4-2a-2} Next, with respect to the target pixel $J(x, y)$ for which $L(x, y)=2$, if the both pixels $J(i, j)$ and $J(k, l)$ that are adjacent to it in the direction perpendicular to the edge direction indicated by $D(x, y)$ have an edge component in the same direction and $L(i, j)=2$, $L(k, l)=2$ in the same manner as $J(x, y)$, the value of $L(x, y)$ is further increased by '1'.

{2-1-4-2a-3} Further, the processing of the above-mentioned {2-1-4-2a-2} is further repeated m times. Then, if edges not less than (m+2) having the same direction and an intensity of not less than a certain value are continuously exists, in the central pixel of the continuous edges, $$L(x, y)=m+1$$

is obtained. Therefore, by comparing the threshold value Thd1 with the value of $L(x, y)$ of an arbitrary pixel, when $$L(x, y) > Thd1 \qquad (1)$$

is satisfied by the $L(x, y)$, a pattern representing "a continuous edge having the same direction" is extracted.

In the above, it is desirable that the threshold value Thd1 has a value corresponding to about 5 to 20 cm in the actual size of the radiography object.

Further, in the above-mentioned case, in order to shorten the calculation time, it is also appropriate to adopt a method shown below instead of the method shown in {2-1-4-2a-1} to {2-1-4-2a-3}.

{2-1-4-2a-4} An image is divided into a plurality of small domains.

{2-1-4-2a-5} In each of the small domains, for the pixels included in the small domain concerned, the number of pixels for which $L(x, y)=1$ is counted in every edge direction indicated by $D(x, Y)$, and is memorized in En (n=1, 2, 3, 4), where n is the same as the index of the edge direction owned by the above-mentioned $D(x, y)$.

{2-1-4-2a-6} On the basis of the result of counting in the above-mentioned {2-1-4-2a-5}, with respect to an arbitrary small domain, if the number of the edge components Em of the Em (m=1, 2, 3, 4) in a certain direction takes the majority of them and has a value not smaller than a predetermined value, it is regarded as true that a pattern representing "a continuous edge having the same direction" is included in the small region.

{2-1-4-2a-7} Further, it is also appropriate that, by uniting the method described in the above-mentioned {2-1-4-2a-1} to {2-1-4-2a-3} and that described in the {2-1-4-2a-4 to {2-1-4-2a-6}, a pattern representing "a continuous edge having the same direction" is included in a small domain where a number of pixels for which the condition $L(x, y) > a$ (a: an arbitrary number larger than 0) is satisfied, which has been obtained in {2-1-4-2a-1} to {2-1-4-2a-3}.

In the case where two patterns extracted in the above exist close to each other, they are regarded as patterns detected along the both sides of a long big bone such as the femur. In such a case, it is considered that a feature of "a long bone" is detected, and the number of times of detecting such a pattern is inputted in the element A[0] of the element A[u] (u=0, 1, - - -)

For the judgment if the two patterns are close to each other, the distance between the patterns are checked along the edges of the pattern representing "a continuous edge having the same direction", and if the distance is not larger than a specified value (for example, the number of pixels corresponding to 3 cm in the actual size of the radiography object), they are judged as close to each other.

Further, in the case where the above-mentioned "continuous edge having the same direction" exists close to each of the both left and right ends of the radiographed object region, it is high the possibility of the contour of the lung field having been detected; therefore, in such a case, it is considered that the feature "the lung field" has been detected, and '1' is inputted in the element A[1].

Further, in the case where the "continuous edge having the same direction" exists in such a manner as to cross the radiographed object region, it is considered that, for example, the contour of "the jaw" has been detected. Therefore, at this time, '1' is inputted in the element A[2].

{2-1-4-2b} Pattern 2: Extraction of a Concentrated Edge Line Without Directivity:

{2-1-4-2b-1} First, the image is divided into a plurality of small domains.

{2-1-4-2b-2} In each of the divisional small domains, for the pixels included in the small domain concerned, the number of pixels for which $L(x, y)=1$ is satisfied is counted for every edge direction indicated by $D(x, y)$, and it is memorized in En (n=1, 2, 3, 4), where n is made the same as the index of the edge direction that the above-mentioned $D(x, y)$ has. Moreover, the sum of the respective En is memorized in E0.

{2-1-4-2b-3} If a number not less than Thd3 of small domains in which the above mentioned E0 takes a value not smaller than a predetermined threshold value Thd2 exist continuously as a straight line, those small domains are extracted.

{2-1-4-2b-4} The En that have been extracted in the above-mentioned {2-1-4-2b-3} for the respective small domains are counted for each n value, and if it can be said that only edge components having a particular direction are not so many, a pattern "concentrated edge line without directivity" is detected for the portion indicated by those extracted small domains.

For the extracted pattern, '1' is inputted in the element A[3].

[2-1-4-2b-5] In the above-mentioned {2-1-4-2a-6} and {2-1-4-2b-4}, for the means for judging whether the edge direction component having a specified direction among a plurality of edge direction components takes a majority or not, a statistical method such as $\chi$ square testing, and a method based on a simple judgment if the number of edge direction components having a specified direction occupies a part not less than a predetermined proportion of the whole number can be cited. Further, as the pattern to be extracted from these signal variations, on top of the above-mentioned, the symmetry of the distribution of pixels for which L(x, y)=1 is satisfied, and the periodicity if the edges having the same direction appear periodically can be considered.

{2-1-4-3} Setting of an Edge Feature Amount:

On the basis of the pattern obtained by the above-mentioned pattern extracting means 220, an edge feature amount can be extracted. In a simple way, it is appropriate that the value of the above mentioned A is extracted as it is.

However, by taking into consideration the number of detected patterns and the combination of the positions, a more significant feature amount can be extracted.

Figure 11:
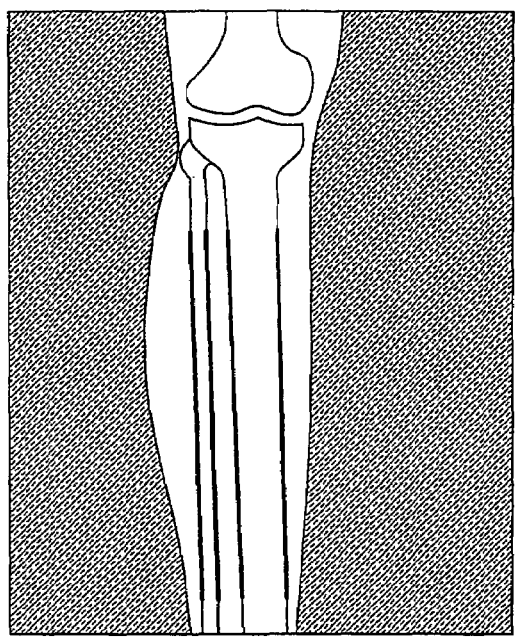
FIG. 11(a) and FIG. 11(b) are illustrations for the example 1 of a pattern of an edge distribution of an example of the embodiment of this invention.
Figure 11:
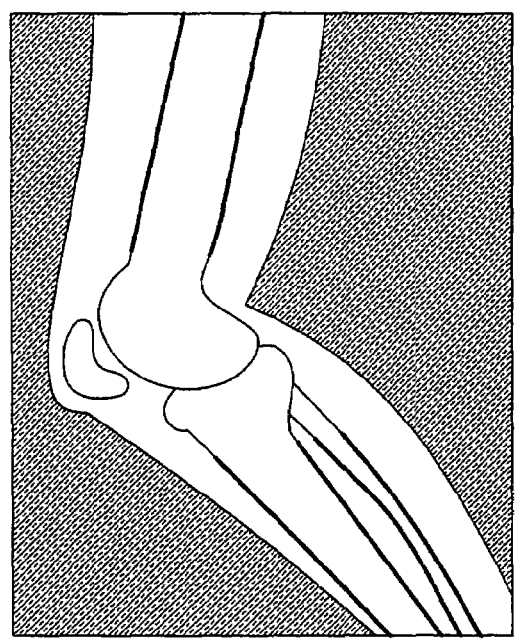
Figure 12:
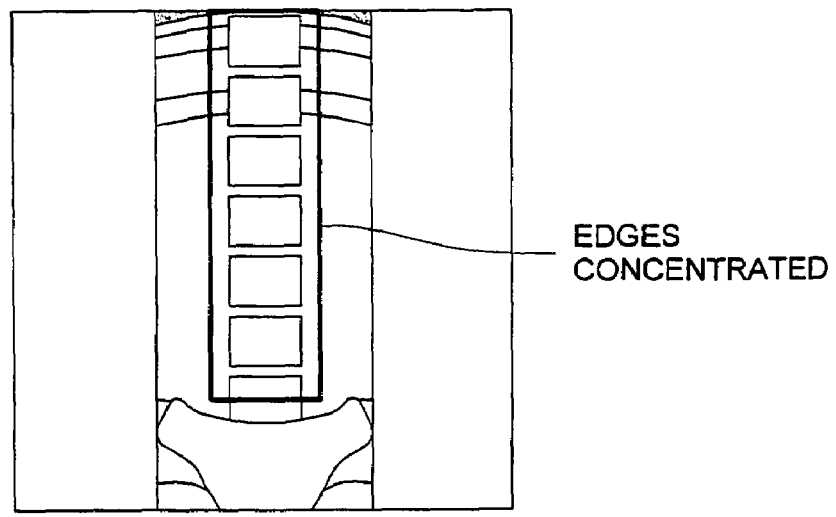
FIG. 12(a) and FIG. 12(b) are illustrations for the example 2 of a pattern of an edge distribution of an example of the embodiment of this invention.
Figure 12:
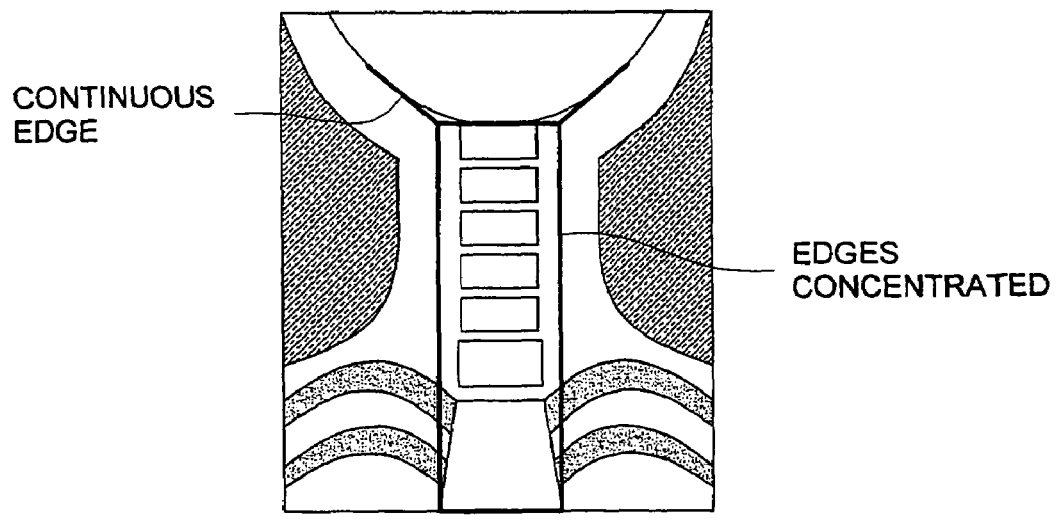

For example, in the case where only one pattern representing "a continuous edge having the same direction" exists as shown in FIG. 11(*a*), it can be discriminated as a particular bone of limbs (lower leg bone in FIG. 11(*a*)) being radiographed, but in the case where a plurality of patterns exist away from one another as shown in FIG. 11(*b*), it is considered that a comparatively large bone such as a bone of limbs exists for each of the positions where the respective patterns exist; that is, it can be understood that the joint to link those comparatively large bones is also radiographed.

Further, if a "concentrated edge line without directivity" and a "continuous edge having the same direction" are exist in an orthogonal manner, it is considered that the possibility of the object being the cervical spine is high.

As described in the above, it is possible to recognize a radiography object directly by the combination of the detected patterns. Therefore, it is desirable that, as a feature amount, a different value is given to each of the above-mentioned combination of patterns to make the combination recognizable, and the value is extracted as a feature amount.

Therefore, in the edge feature amount setting means 230, feature amounts are set as follows, and values are set in the elemental vector C1 of the feature vector P.

[M2]

(No mathematical expression is presented in the Japanese specification.)

| Value of A | value of element | Name | Region supposed |
|---|---|---|---|
| 1) A = {1, 0, x, 0}: | C1 = (1, 0, 0, 0, 0, 0) | "L1" | humerus, femur, etc. |
| 2) A = {2, 0, x, 0}: | C1 = (0, 1, 0, 0, 0, 0) | "L2" | elbow joint, knee joint, etc. |
| 3) A = {0, 1, x, x}: | C1 = (0, 0, 1, 0, 0, 0) | "0" | thorax, thoracic spine, etc. |
| 4) A = {0, 0, 0, 1}: | C1 = (0, 0, 0, 1, 0, 0) | "T" | lumbar, etc. |
| 5) A = {0, 0, 1, 1}: | C1 = (0, 0, 0, 0, 1, 0) | "N" | cervical spine, etc. |
| 6) For others: | C1 = {0, 0, 0, 0, 0, 1) | "E" | head, etc. |

The feature vector P, of which each of its elemental vectors C0 and C1 is obtained in the above-mentioned way, is transmitted to the correlativity calculating means 320.

{2-2} Recording of Radiography Object Information:

In the above-mentioned radiography object information memorizing means 360, n object vectors Si (i=1,2, - - - ,n), which describe the feature of the respective regions of the radiography object, and the elements of the region information Ii (i=1,2, - - - ,n) associated with Si are memorized.

The above-mentioned object vectors Si are vectors in which evaluation values of the respective elemental values of the feature vector P are described, and by the correlation means to be described later, the evaluation values are read out for the correlation operation with the feature vector P, and used as correlation values.

With respect to the object vector Si, each of its element Vj (j=0,1,2, - - - ,m) corresponding to Cj is described as a table of evaluation values in which an evaluation value is described for each of values that can be taken by Cj. For example, for the above-mentioned vector element Cs representing the shape of a radiography object, the element Vs corresponding to it is a vector having components {a,b,c}.

Further, in the region information Ii, names such as the number and name associated uniquely with each of the regions of the object, and the name of the radiographing orientation are memorized, and by referring to the number that the region information Ii has, the selection of the image processing condition is done, while the names of the region and the radiographing orientation are used in the display by the image processing condition selecting means 40 (a monitor display device provided in the operation panel for example) for the final selection.

Further, in the region information, priority which is determined uniquely for each of the elements of the region information is included. The priority is represented by any one of natural numbers and '0', and the larger number represents the higher priority. Further, in the case where the value representing the priority is '0', the component of the region information concerned is not read out from the radiography radiography object information memorizing means 360, regardless of the result of the correlation operation to be described later. This priority is set beforehand in accordance with, for example, the department of diagnosis and treatment of a hospital using the radiographing apparatus utilizing this invention.

In this way, it is for the following reason that the image processing condition that can be selected beforehand is limited to a part and the priority is set. That is, for example, in the case where a hospital for internal diseases uses a radiographing apparatus utilizing this invention, it can be considered rare to carry out radiographing of bones of the arm or the leg as the object. Therefore, in such a case, by making the image processing condition for the radiographing of the bones of the arm or the leg as the object be not selected, or by making it difficult to select the condition by lowering its priority, an unnecessary alternative is removed; therefore, the accuracy in the selection of an optimum image processing condition can be improved. In particular, in carrying out the discrimination for a radiograph in which two radiographed regions of a radiography object are simultaneously taken as in radiographing the abdomen or the lumbar taken as the main object, this setting of the priority works effectively.

{2-3} Calculation of Correlation, Comparison of the Degree of Correlation, Temporary Memory:

In the correlation calculation means 320, for the object vector Si read out from the above-mentioned radiography object information memorizing means 360, and the feature vector P obtained by the above-mentioned feature vector generating means 310, the degree of correlation is successively calculated.

Now, the degree of correlation can be obtained as the total sum Ti of the correlation values of the respective elements (the degree of correlation, namely), which have been obtained for the elements of P and Si corresponding to each other. The degree of correlation Ti is transmitted to the correlation result comparing means 330, and is compared with the predetermined threshold value Thd4.

In the case where the degree of correlation Ti is not less than said threshold value Thd4, the element of the region information corresponding to the object vector Si concerned is read out from the radiography object information memorizing means 360, and is memorized in the temporary memory means 340. Then, after the correlation operation with all the object vectors Si is finished, the elements of the region information memorized in the temporary memory means 340 are transmitted to the image processing condition selecting means 40.

{2-3-1} Calculation of the Degree of Correlation:

The correlation operation between each of the elements Cj of the feature vector P and each of the elements Vj of the object vector Si is carried out in the following way.

Because the element Cj of the feature vector P and the element Vj of the object vector Si corresponding to Cj are both described as a vector having the same number of elements, the evaluation value for Cj can be taken out from Vj by calculating $tCjVj$, and this is outputted as the correlation value.

For example, if the element Cs of the above-mentioned feature vector representing the shape of a radiography object is {0,0,1}, because the corresponding element Vs of the object vector is defined as {a,b,c}, the correlation value is obtained as 'c'. Further, if Cs is {1,0,0}, the correlation value becomes 'a'.

Further, if this method of correlation is used, because the evaluation value can be designated for each of the object vectors, by making the evaluation value for a particular element larger, it can be set in a delicate manner, which element is to be emphasized.

For example, for the "head region", because it can be generally discriminated by the feature that the "shape of the object" is of barrel type, the values of the respective elements of Vs corresponding to Cs is set in such a manner as to take larger values as compared to those of the other elements Vj, in order that the correlation result for the element Cs corresponding to the "shape of the object" may become large.

Further, in the case where it is discriminated whether the object is the "finger region" or not, because the "size of the object" becomes an effective factor of discrimination, for the object vector corresponding to the "finger region", it can be exactly recognized by making the evaluation value for the "size of the object" larger than the other elements.

As described in the above, by changing the weight for each of the elements of the object vector, more exact recognition can be carried out.

Now, each of the above-mentioned object vectors Si (i=1,2,3,4,5) is set with correspondence to each of the regions of a human body as shown in the following expressions.

[M3]

| Object vector region | Evaluation value V0 | V1 | Corresponding |
|---|---|---|---|
| S1 | (50, 0, 0, 20, 0, 0) | (0, 0, 0, 0, 0, 50) | head |
| S2 | (0, 50, 0, 10, 10, 0) | (0, 0, 0, 30, 50, 0) | head |
| S3 | (0, 0, 0, 50, 30, 0) | (0, 0, 50, 30, 10, 0) | head |
| S4 | (0, 0, 0, 50, 30, 0) | (0, 0, 0, 50, 20, 0) | head |
| S5 | (0, 0, 50, 30, 50, 0) | (50, 50, 0, 0, 0, 0) | head |

Besides, as described in the foregoing, the values of the elemental vector C0=(a0,a1,a2,a3,a4,a5) of the feature vector P corresponds to "barrel type", "sandglass type", "boomerang type", "square type", "rectangle type", and "others" successively from a0 to a5, and the values of the elemental vector C1=(b0,b1,b2,b3,b4,b5) corresponds to "L1", "L2", "0", "T", "N", and "E" successively from b0 to b5.

At this time, it is assumed that radiographing has been carried out for the thorax region, and as the result of extraction of the feature, the feature vector P has been obtained.

P1: C0=(0,0,0,1,0,0), C1=(0,0,1,0,0,0).

The degree of correlation Ti (i=1,2,3,4,5) between feature vector P1 and the above-mentioned respective vectors is as follows:

T1=0, T2=10, T3=100, T4=50, T5=30.

Further, it is assumed that radiographing has been carried out for the neck region, and the feature vector P2 has been obtained, and has values as shown in the following.

P2: C0=(0,0,0,0,1,0), C1=(0,1,0,0,0,0).

In this case, the degree of correlation Ti (i=1,2,3,4,5) between the feature vector P2 and the above-mentioned respective object vectors is as follows:

T1=0, T2=100, T3=10, T4=20, T5=0.

The degrees of correlation Ti obtained in the above-mentioned manner are transmitted to the correlation result comparing means 330.

{2-3-2} Comparison of the Result of Correlation:

In the correlation result comparing means 330, the degree of correlation Ti is compared with the predetermined threshold value Thd4. Now, assuming that the threshold value Thd4=50, in the case of the above-mentioned feature amount P1, because T3, T4$\geq$thd4, the elements of the region information of the thorax region and the abdomen region corresponding to S3 and S4 are memorized in the temporary memory means 340, and after that, they are transmitted to the image processing condition selecting means 40.

Further, in the case of the above-mentioned feature vector P2, because T2$\geq$Thd4, the element of the region information of the neck region corresponding to S2 is memorized in the temporary memory means 340, and after that, it is transmitted to the image processing condition selecting means 40.

For the setting value of this threshold value Thd4, it is desirable that it is set at a value such that 1 to 5 elements of the region information as a criterion for every radiographing can be selected. If the threshold value is set at too high a value, it often occurs that the degree of correlation Ti cannot exceed the threshold value for all of the object vectors, and as the result, a suitable image processing condition cannot be presented to a user.

On the contrary, if the threshold value is set at too low a value it cannot be avoided to present many image processing conditions to a user, which makes it impossible to fulfil the object of this invention to reduce the burden of a user by presenting automatically an image processing condition that is considered suitable.

For another method of making up the correlation result comparing means 330, such one as described below can be cited. That is, it is a method such that, for all of the degrees of correlation Ti obtained, by comparing the values with one another, the elements of the region information corresponding to only a certain number of them (1 to 5 or so) including the one judged as having the highest degree of correlation and the successive ones in the order of the degree of correlation are transmitted to the image processing condition selecting means 40. According to this method, a certain number of image processing conditions can be always presented to a user. Further, as described in the above, also in the case where the elements of the region information are selected by comparing the degrees of correlation with one another, it is also possible that by specifying the above-mentioned threshold value Thd4 beforehand, the elements of the region information, for which only values of the degree of correlation that cannot exceed the threshold value Thd4 have been obtained, are made not to be transmitted to the image processing selecting means 40. By doing this way, it can be reduced the possibility that an unsuitable image processing condition based on the result of an erroneous recognition of the radiography object.

{2-4} According to the method described in the foregoing, it is possible to obtain the object region information; however, as another method of making up the discriminating means, a method using pattern matching or a method using a neural network can be considered.

{3} Selection of Image Processing Condition, Memorizing Image Processing Conditions, and Image Processing:

The image processing selecting means 40 reads out one or a plurality of the image processing conditions corresponding to the region information which has been transmitted from the discriminating means 30 from the image processing condition memorizing means 50. Then, the read out image processing conditions are displayed on a display means or the like so as to make it possible for a user to select one.

In other way, a part or all of the read out image processing conditions are transmitted to the image processing means 60 beforehand, and in each of these image processing conditions, image processing for the original image is carried out. The processed images obtained as the result of that are transmitted back to the image processing condition selecting means 40, and the processed images are displayed together with the image processing conditions to the user.

Then, the image processing condition selected by the selection of the user is transmitted to the image processing means 60. In the image processing means 60, for the original image that has been transmitted from the radiation image generating means 10, image processing is carried out using this image processing condition, and a final output image is obtained. For the image processing to be practiced, gradation conversion, edge emphasizing, equalization processing, enlargement/reduction processing, and combinations of these can be cited.

The above-mentioned image processing condition is composed of processing designating information indicating which one among the above-mentioned image processing items is to be done, and a group of parameters that is necessary for practicing the processing. For example, in the case where the image processing to be practiced is gradation conversion, a look-up table (LUT) to be utilized for converting the pixel signal values of an original image into pixel signal values of output image is in it, for edge emphasizing processing, a parameter indicating the spatial frequency to emphasize and a parameter indicating the degree of enhancement are included.

Further, in the above-mentioned image processing condition, an indirect parameter which does not directly determines the image processing is also included. For examples of this indirect parameter, one that designates the processing for preparing an LUT for carrying out gradation conversion processing, and the standard signal value of the original image that is necessary for preparing an LUT. The reason why such an indirect parameter is necessary is that the LUT for producing an optimum output image becomes different depending on the conditions such as the physical constitution of the patient to become the radiography object and the dose of the radiation when the radiographing is practiced.

Figure 13:
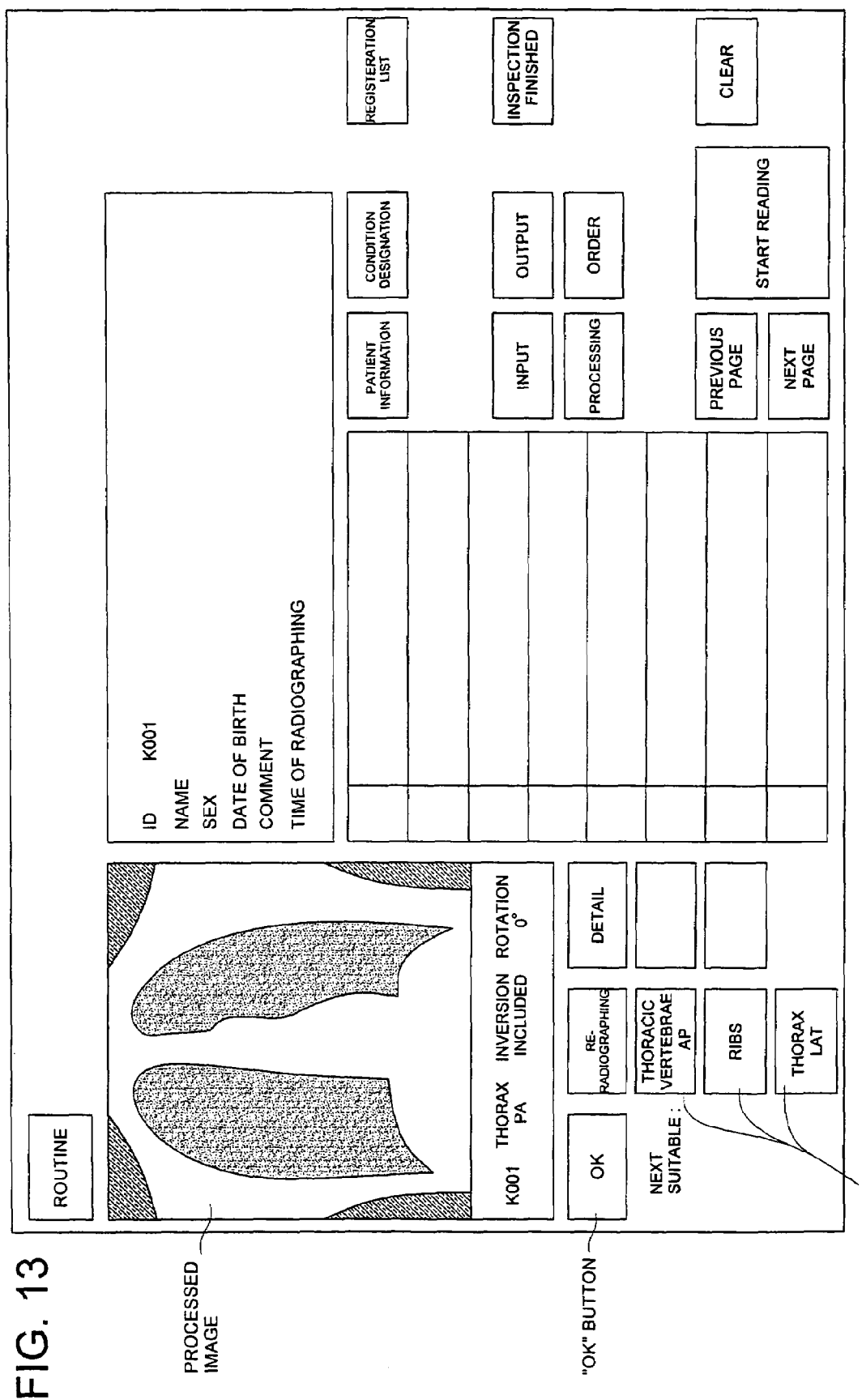
FIG. 13 is a drawing showing how to select image processing in an example of the embodiment of this invention.

In the example shown in FIG. 13, the image processing condition selecting means 40 is integral with the operation screen, and carries out image processing using the image processing condition only that has been given the largest correlation result by the above-mentioned discriminating means 30, or in other words, is considered most suitable; the processed image or a simplified image for confirmation obtained by reducing the number of pixels of the processed image is displayed on the operation screen. Further, in order to make the image processing condition used in the processing recognizable at a glance, the name of the image processing condition, and whether image rotation or image inversion is included or not are displayed on the same screen.

Then, if the processed image is an image that has been subjected to image processing suitable for the user, the processing is settled by pressing the button with the indication "OK".

Further, among the image processing conditions which have been transmitted from the above-mentioned discriminating means 30, ones that have not been used in the practice of processing are displayed as "Next suitable buttons" indicating the names of processing ("thoracic spine AP", "ribs", etc. in FIG. 13).

If the above-mentioned processed image is not an image suitable for the user, by selecting any one of these "Next suitable buttons", the image processing condition corresponding to the selected "Next suitable button" is transmitted to the image processing means 60, and image processing is practiced in accordance with this image processing condition.

At this time, an image that has been processed again is displayed in place of the image displayed before, which makes it possible for the user to confirm the processing at a glance (refer to FIG. 14). Then, in the same way as the above-mentioned, if it is an image that is subjected to image processing desirable for the user, by pressing the button with the indication "OK", the processing is settled.

Further, in the case where the operation screen has a sufficient space, it is also appropriate that, in connection with above-mentioned "Next suitable buttons", images subjected to the processing based on the image processing conditions corresponding to respective "Next suitable buttons" are displayed.

Further, it is also possible to make the structure such one that, for each of the image processing conditions that have been read out from the image processing condition memorizing means 50, a processed image is produced beforehand by applying the processing to the above-mentioned original image by using the image processing means 60, those processed images are displayed on the image selecting means 70, and the one considered most suitable is selected by looking at those displayed images for comparison.

Figure 15:
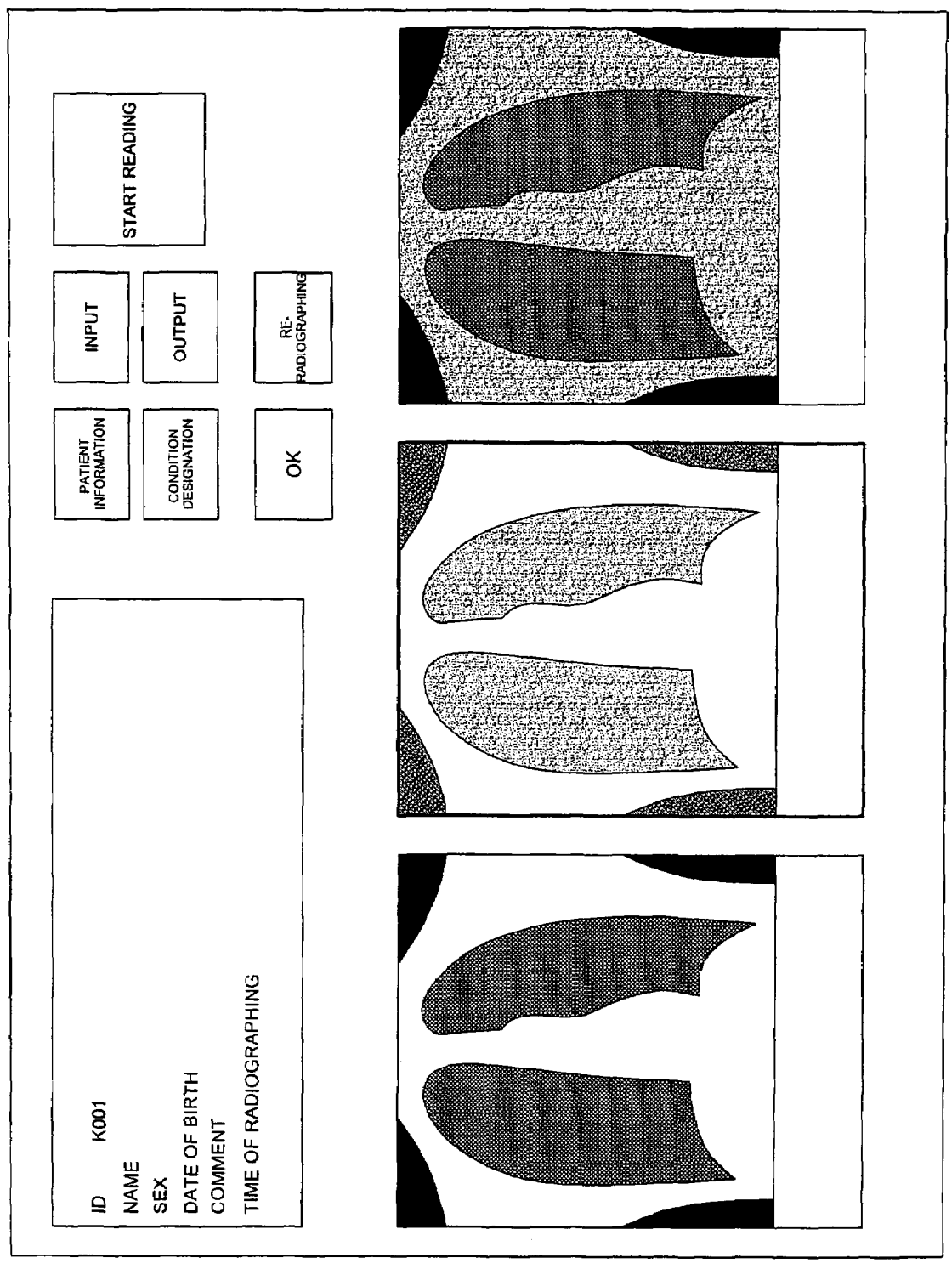
FIG. 15 is a drawing showing how to select image processing in an example of the embodiment of this invention.

An example of practice of this is shown in FIG. 15. In the case of such a structure, because a processed image is selected as it is confirmed directly, it is not necessary to display the respective image processing conditions particularly.

Further, the image processing conditions based on the region information obtained from the discriminating means 30 do not always include the image processing condition that the user desires. Therefore, it is desirable that, in the image processing condition selecting means 40, there is provided means for making it possible for a user to select an arbitrary image processing condition out of all the image processing conditions that are prepared beforehand, regardless of the image processing conditions based on the region information obtained by the discriminating means 30. For example, it is appropriate that, by pressing the button with the indication "Condition" in FIG. 13, a list of image processing conditions prepared beforehand are displayed, and a user can select an arbitrary image processing condition out of them.

As explained in detail up to now, according to this invention, for a radiation image, by recognizing the radiographed region of a radiography object and the radiographing orientation through reading the image, it becomes possible that one or a plurality of proper image processing conditions regarded as suitable ones are selected and presented, and by selecting an optimum condition out of the presented image processing conditions, an image that is most suitable for diagnosis is obtained without a troublesome operation.

What is claimed is:

1. A medical image processing apparatus, comprising:
    a feature vector producing section to analyze radiation image data including radiographed object image data corresponding to a radiographed object with plural different analyzing methods, to extract plural different features of the radiographed object image data and to produce a radiographed object image data feature vector constructed with vector element of the extracted plural different features, wherein the plural different features include an external contour feature representing a feature of an external contour of a body part comprising at least one of a head, an abdomen and a leg and an edge distribution feature representing a feature of an edge distribution pattern indicating signal variations among neighboring pixels;
    a body part feature vector memorizing section to memorize plural body part feature vectors of plural different body parts in advance, wherein each of the plural body part feature vectors includes an external contour feature and an edge distribution feature; and
    a discriminating section to obtain a correlation degree between the radiographed object image data feature vector and each of the plural body part feature vectors and discriminate a body part corresponding to the radiographed object image data on the basis of the correlation degree for each of the plural different body parts.

2. The medical image processing apparatus of claim 1, wherein the discriminating section determines a body part having the highest correlation degree among the plural correlation degrees as the body part corresponding to the radiographed object image data.

3. The medical image processing apparatus of claim 1, wherein the feature vector producing section extracts each feature with a feature amount and the discriminating section obtains the plural correlation degrees by providing the feature amount of each feature with a different weight factor in accordance with the kind of each of the plural different body parts.

4. The medical image processing apparatus of claim 1, further comprising:
    a radiographed object image region extracting section to extract a radiographed object image region corresponding to the radiographed object from the radiation image data corresponding to a radiographed region.

5. The medical image processing apparatus of claim 4, wherein the feature vector producing section extracts at least two features from the radiographed object image data corresponding to the radiographed object image region.

6. The medical image processing apparatus of claim 4, wherein the feature vector producing section extracts the size of the radiographed object image region as one of the features.

7. The medical image processing apparatus of claim 4, wherein the feature vector producing section extracts the shape of the radiographed object image region as one of the features.

8. The medical image processing apparatus of claim 4, wherein the feature vector producing section extracts a characteristic value calculated on a basis of a signal variation between neighboring pixels as one of the features.

9. The medical image processing apparatus of claim 8, wherein the characteristic value calculated on a basis of the signal variation is an edge distribution.

10. The medical image processing apparatus of claim 9, wherein the edge distribution includes an edge orientation and an edge intensity.

11. The medical image processing apparatus of claim 1, further comprising:
    an image processing section to determine a processing condition on the basis of the discriminated body part and to conduct an image processing for the radiation image data on a basis of the processing condition.

12. The medical image processing apparatus of claim 11, wherein the discriminating section discriminates a radiographing orientation with reference to the discriminated body part corresponding to the radiographed object.

13. The medical image processing apparatus of claim 12, wherein the image processing section comprises an image processing condition memorizing section to memorize plural image processing conditions corresponding to at least one of the plural different body parts and plural radiographing orientations.

14. The medical image processing apparatus of claim 12, wherein the image processing section comprises a display section to indicate the image processing condition and a medical image corresponding to the processed radiation image data.

15. The medical image processing apparatus of claim 14, wherein the image processing section comprises a selecting section to select an arbitrary image processing condition from plural image processing conditions indicated on the display section.

16. The medical image processing apparatus of claim 15, wherein the image processing section indicates plural medical images corresponding to plural sets of radiation image data obtained by plural image processing condition on the display section and an arbitrary image pxocessing condition is selected with the selecting section on the basis of the plural medical images indicated on the display section.

17. The medical image processing apparatus of claim 15, wherein the image processing section indicates a name to specify the image processing.

18. The medical image processing apparatus of claim 15, wherein the image processing section indicates the necessity of image rotation and the necessity of image inversion together with the image processing condition.

19. A medical image processing apparatus, comprising:
    a feature vector producing section to analyze radiation image data including radiographed object image data corresponding to a radiographed object with plural different analyzing methods, to extract plural different features of the radiographed object image data and to produce a radiographed object image data feature vector constructed with vector elements of the extracted plural different features;
    a body part feature vector memorizing section to memorize plural body part feature vectors of plural different body parts in advance; and a discriminating section to obtain a correlation degree between the radiographed object image data feature vector and each of the plural body part feature vectors and discriminate a body part corresponding to the radiographed object image data on the basis of the correlation degree for each of the plural different body parts, wherein the feature vector producing section extracts each feature with a feature amount and the discriminating section obtains the plural correlation degrees by providing the feature amount of each feature with a different weight factor in accordance with the kind of each of the plural different body parts.

20. The medical image processing apparatus of claim 19, wherein the discriminating section determines a body part having the highest correlation degree among the plural correlation degrees as the body part corresponding to the radiographed object image data.

21. The medical image processing apparatus of claim 19, further comprising:

a radiographed object image region extracting section to extract a radiographed object image region corresponding to the radiographed object from the radiation image data corresponding to a radiographed region.

22. The medical image processing apparatus of claim 19, wherein the feature vector producing section extracts at least two features from the radiographed object image data corresponding to the radiographed object image region.

23. The medical image processing apparatus of claim 22, wherein the feature vector producing section extracts the size of the radiographed object image region as one of the features.

24. The medical image processing apparatus of claim 22, wherein the feature vector producing section extracts the shape of the radiographed object image region as one of the features.

25. The medical image processing apparatus of claim 22, wherein the feature vector producing section extracts a characteristic value calculated on a basis of a signal variation between neighboring pixels as one of the features.

26. The medical image processing apparatus of claim 25, wherein the characteristic value calculated on a basis of the signal variation is an edge distribution.

27. The medical image processing apparatus of claim 26, wherein the edge distribution includes an edge orientation and an edge intensity.

* * * * *